(12) United States Patent
Gentle et al.

(10) Patent No.: US 11,486,113 B2
(45) Date of Patent: Nov. 1, 2022

(54) CONTROL SYSTEM FOR A GRADING MACHINE

(71) Applicant: Caterpillar Inc., Deerfield, IL (US)

(72) Inventors: Michael C. Gentle, Maroa, IL (US); Ethan M. Tevis, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 338 days.

(21) Appl. No.: 16/204,611

(22) Filed: Nov. 29, 2018

(65) Prior Publication Data
US 2020/0173135 A1 Jun. 4, 2020

(51) Int. Cl.
| | |
|---|---|
| *E02F 3/84* | (2006.01) |
| *E02F 9/26* | (2006.01) |
| *B62D 17/00* | (2006.01) |
| *E02F 9/20* | (2006.01) |
| *E02F 3/76* | (2006.01) |
| *B62D 6/00* | (2006.01) |
| *B62D 9/04* | (2006.01) |

(52) U.S. Cl.
CPC ............... *E02F 3/841* (2013.01); *B62D 6/00* (2013.01); *B62D 9/04* (2013.01); *B62D 17/00* (2013.01); *E02F 3/764* (2013.01); *E02F 3/844* (2013.01); *E02F 9/2041* (2013.01); *E02F 9/2087* (2013.01); *E02F 9/26* (2013.01); *E02F 3/7659* (2013.01)

(58) Field of Classification Search
CPC ....... E02F 3/764; E02F 3/7654; E02F 3/7659; E02F 3/841; E02F 3/844; E02F 9/2041
See application file for complete search history.

(56) References Cited

U.S. PATENT DOCUMENTS

| | | | |
|---|---|---|---|
| 1,759,505 | A | 5/1930 | Green |
| 2,577,340 | A | 12/1951 | MacDonald |
| 2,858,663 | A | 11/1958 | Schwarz |
| 2,961,783 | A | 11/1960 | Bowen |
| 3,052,997 | A | 9/1962 | Holland |
| 3,677,350 | A | 7/1972 | Johnson |
| 3,739,861 | A | 6/1973 | Johnson |
| 3,881,563 | A | 5/1975 | Hammersmith |
| 3,974,699 | A | 8/1976 | Morris |
| 4,074,767 | A | 2/1978 | Cole |
| 4,162,708 | A | 7/1979 | Johnson |
| 4,279,312 | A | 7/1981 | Pyle |
| 4,431,060 | A | 2/1984 | Scholl |
| 4,524,836 | A | 6/1985 | Pehrson |
| 4,955,437 | A | 9/1990 | Pehrson |

(Continued)

FOREIGN PATENT DOCUMENTS

| | | |
|---|---|---|
| CN | 102322080 B | 8/2015 |
| WO | 00/36231 A1 | 6/2000 |

*Primary Examiner* — Gary S Hartmann
(74) *Attorney, Agent, or Firm* — Bookoff McAndrews, PLLC

(57) ABSTRACT

A grading machine includes a machine body, a grading blade, and at least one grading blade sensor configured to sense a position and orientation of the grading blade. The grading machine also includes a drawbar connecting the grading blade to the machine body, at least one drawbar sensor configured to sense a position and orientation of the drawbar, a user interface, and a control system. The control system may be configured to receive an input from the user interface and perform an automatic turnaround operation.

10 Claims, 20 Drawing Sheets

(56) References Cited

U.S. PATENT DOCUMENTS

| | | | |
|---|---|---|---|
| 5,078,215 A | 1/1992 | Nau | |
| 5,277,258 A | 1/1994 | O'Dell | |
| 5,462,125 A | 10/1995 | Stratton | |
| 5,511,326 A | 4/1996 | Liebrecht, Jr. | |
| 5,667,020 A | 9/1997 | Palmer | |
| 5,764,511 A | 6/1998 | Henderson | |
| 5,925,085 A | 7/1999 | Kleimenhagen | |
| 5,947,225 A | 9/1999 | Minolta | |
| 5,951,612 A | 9/1999 | Sahm | |
| 6,028,524 A | 2/2000 | Hartman | |
| 6,112,145 A | 8/2000 | Zachman | |
| 6,129,156 A | 10/2000 | Boast et al. | |
| 6,152,237 A | 11/2000 | Hartman | |
| 6,181,999 B1 | 1/2001 | Yamamoto et al. | |
| 6,249,992 B1 | 6/2001 | Irving | |
| 6,269,885 B1 | 8/2001 | Barber | |
| 6,275,758 B1 | 8/2001 | Phelps | |
| 6,278,955 B1 | 8/2001 | Hartman et al. | |
| 6,286,606 B1 * | 9/2001 | Krieg | E02F 3/764 172/4.5 |
| 6,295,746 B1 | 10/2001 | Meduna | |
| 6,389,345 B2 | 5/2002 | Phelps | |
| 6,523,617 B2 | 2/2003 | McGugan | |
| 7,121,355 B2 | 10/2006 | Lumpkins et al. | |
| 7,178,606 B2 | 2/2007 | Pecchio | |
| 7,293,376 B2 | 11/2007 | Glover | |
| 7,364,003 B2 | 4/2008 | Holt | |
| 7,588,088 B2 | 9/2009 | Zachman | |
| 7,647,983 B2 | 1/2010 | Gharsalli | |
| 7,658,236 B2 | 2/2010 | Howson | |
| 7,676,967 B2 | 3/2010 | Gharsalli | |
| 7,874,377 B1 * | 1/2011 | Graeve | E02F 3/7677 172/796 |
| 7,980,319 B2 | 7/2011 | Maeda | |
| 8,103,417 B2 | 1/2012 | Gharsalli | |
| 8,141,650 B2 | 3/2012 | Breiner | |
| 8,276,476 B2 | 10/2012 | Diccion | |
| 8,291,999 B2 | 10/2012 | Howson | |
| 8,352,127 B2 | 1/2013 | Wahlström | |
| 8,412,420 B2 * | 4/2013 | Ruhter | E02F 3/765 701/50 |
| 8,437,920 B2 | 5/2013 | Hobenshield | |
| 8,464,803 B2 | 6/2013 | Greuel | |
| 8,548,680 B2 | 10/2013 | Ryerson | |
| 8,738,242 B2 | 5/2014 | Konno | |
| 8,985,233 B2 | 3/2015 | Padilla | |
| 9,217,238 B2 | 12/2015 | Sharma | |
| 9,227,478 B2 | 1/2016 | Horstman | |
| 9,228,316 B2 | 1/2016 | Staade | |
| 9,234,330 B2 | 1/2016 | Sharma et al. | |
| 9,290,910 B2 | 3/2016 | Sharma et al. | |
| 9,605,407 B2 | 3/2017 | Penner | |
| 9,637,889 B2 | 5/2017 | Elkins | |
| 9,650,763 B2 | 5/2017 | Taylor | |
| 9,896,820 B2 | 2/2018 | Faivre | |
| 9,938,689 B2 | 4/2018 | Chaston | |
| 10,030,366 B2 | 7/2018 | Tevis | |
| 10,266,201 B2 * | 4/2019 | Dang | G05D 1/0212 |
| 10,301,794 B2 | 5/2019 | Moriki | |
| 10,428,493 B2 | 10/2019 | Omelchenko | |
| 10,590,624 B2 | 3/2020 | Gundupalli | |
| 10,620,004 B2 | 4/2020 | Gentle | |
| 10,883,248 B2 | 1/2021 | Stotlar | |
| 11,346,079 B2 * | 5/2022 | Christofferson | E02F 3/845 |
| 2006/0042904 A1 | 3/2006 | De Maziere | |
| 2007/0215367 A1 | 9/2007 | Smart et al. | |
| 2008/0005177 A1 * | 1/2008 | Steckel | A01B 79/005 |
| 2009/0056961 A1 | 3/2009 | Gharsalli | |
| 2009/0313860 A1 | 12/2009 | Breiner et al. | |
| 2011/0247845 A1 | 10/2011 | Greuel | |
| 2013/0180744 A1 | 7/2013 | Favreau | |
| 2013/0255977 A1 | 10/2013 | Braunstein et al. | |
| 2013/0304331 A1 | 11/2013 | Braunstein | |
| 2014/0326471 A1 | 11/2014 | Zhu | |
| 2016/0153166 A1 | 6/2016 | Gentle | |
| 2017/0284067 A1 | 10/2017 | Tevis et al. | |
| 2018/0077865 A1 * | 3/2018 | Gallmeier | G05D 1/0227 |
| 2018/0127948 A1 | 5/2018 | Villalba Hernández | |
| 2018/0155900 A1 | 6/2018 | Sharpe | |
| 2020/0048870 A1 | 2/2020 | Peat | |
| 2020/0087888 A1 | 3/2020 | Kean | |
| 2020/0102718 A1 | 4/2020 | Cline | |
| 2020/0115884 A1 | 4/2020 | Christofferson | |

* cited by examiner

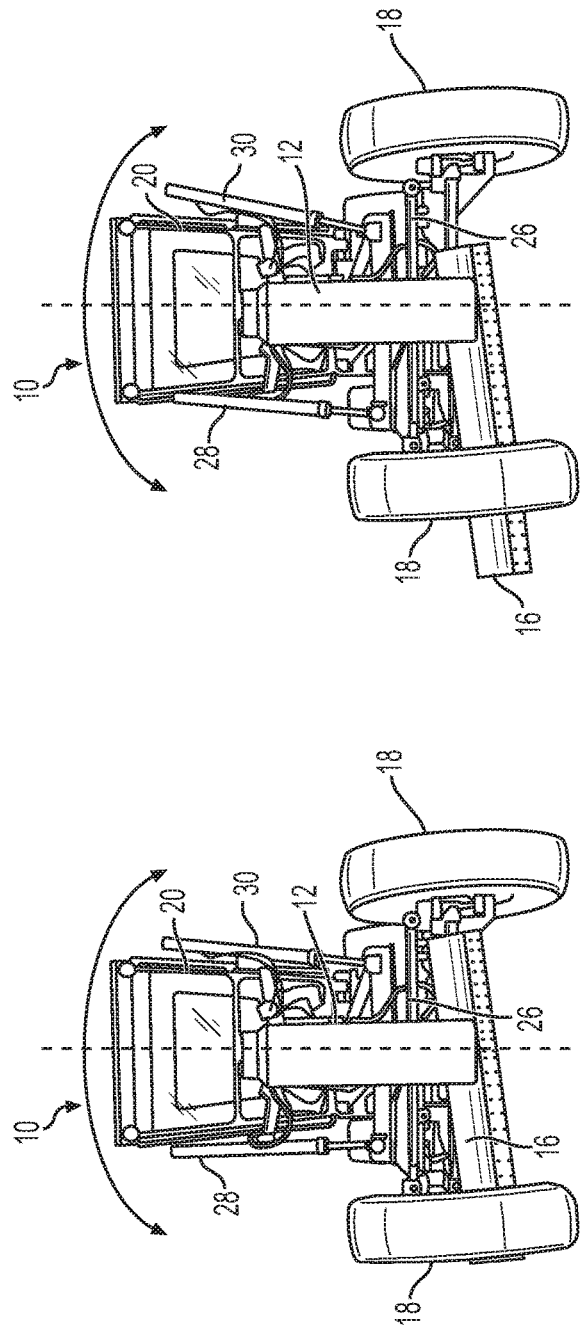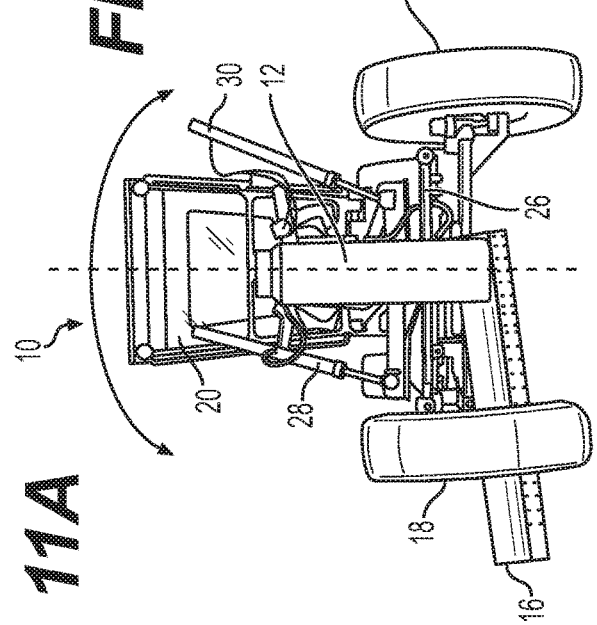

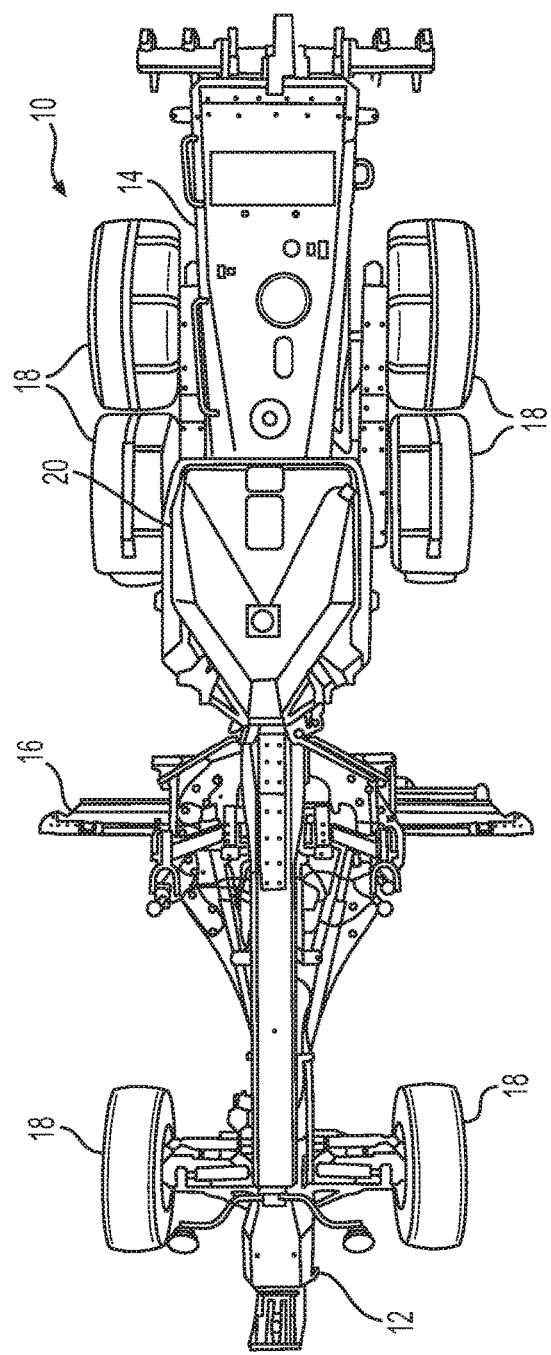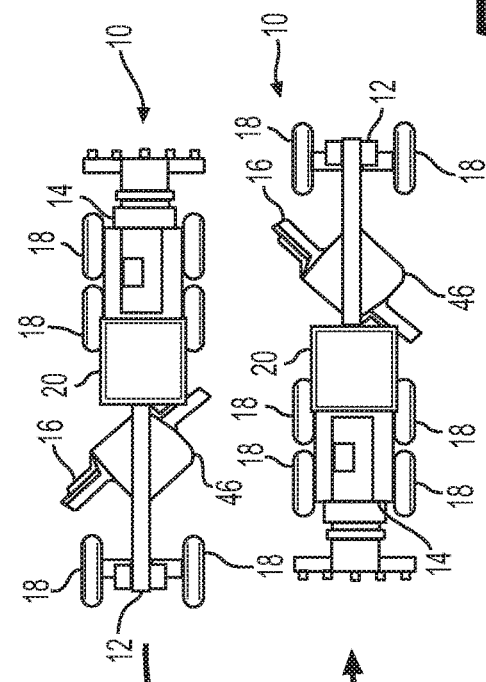

CONTROL SYSTEM FOR A GRADING MACHINE

TECHNICAL FIELD

The present disclosure relates generally to a grading machine, and more particularly, to a control system for a grading machine.

BACKGROUND

The present disclosure relates to mobile machines that are used in grading. Grading machines are typically used to cut, spread, or level material that forms a ground surface. To perform such earth sculpting tasks, grading machines include a blade, also referred to as a moldboard or implement. The blade moves relatively small quantities of earth from side to side, in comparison to a bulldozer or other machine that moves larger quantities of earth. Grading machines are frequently used to form a variety of final earth arrangements, which often require the blade to be positioned in different positions and/or orientations depending on the sculpting task. The different blade positions may include adjustments to the blade height, blade cutting angle, blade pitch, blade sideshift, and drawbar sideshift. Accordingly, grading machines may include several operator controls to manipulate various portions of the machine. Positioning and orienting the blade of a motor grader is a complex and time consuming task that may require a great deal of experience and/or expertise.

U.S. Pat. No. 5,078,215, issued to Nau on Jan. 7, 1992 ("the '215 patent"), describes a method and apparatus for controlling the slope of a blade for a grading machine. The '215 patent allows an operator to select a desired cross slope angle of the surface bring worked. A control system then measures a slope angle of the blade and adjusts the slope angle of the blade as needed in order for the blade to maintain the desired slope angle to form the selected cross slope angle as the blade traverses the surface. The blade positioning and adjustment method and system of the '215 patent may not provide sufficient positioning or orienting options, and thus, may not provide an inexperienced operator with the ability to perform various operations with the grading machine. The control system for a grading machine of the present disclosure may solve one or more of the problems set forth above and/or other problems in the art. The scope of the current disclosure, however, is defined by the attached claims, and not by the ability to solve any specific problem.

SUMMARY

In one aspect, a grading machine may include a machine body, a grading blade, and at least one grading blade sensor configured to sense a position and orientation of the grading blade. The grading machine may also include a drawbar connecting the grading blade to the machine body, at least one drawbar sensor configured to sense a position and orientation of the drawbar, a user interface, and a control system. The control system may be configured to receive an input from the user interface and perform an automatic turnaround operation.

In another aspect, a method of operating a grading machine may include sensing a drawbar centershift position of a drawbar with a sensor to determine a first centershift position, and sensing an angle of a circle to determine a first circle angle position, where the circle is rotatably coupled to the drawbar to position a grading blade. The method may also include receiving a user input to perform an automatic turnaround operation, and activating an automatic turnaround operation. The automatic turnaround operation may include positioning the drawbar to a second centershift position that mirrors the first centershift position relative to a centerline of the grading machine and positioning the circle to a second circle angle position that mirrors the first circle angle position relative to the centerline of the grading machine.

In a further aspect, a method of operating a grading machine may include receiving a user input to perform an automatic turnaround operation on a user interface, sensing a first drawbar orientation with at least one drawbar sensor coupled to a drawbar, sensing a first grading blade orientation with at least one blade sensor coupled to the grading blade, steering the grading machine in a partial circle, and actuating one or more actuators to position the drawbar in a second drawbar orientation and the grading blade in a second grading blade orientation. The second drawbar orientation and the second grading blade orientation may mirror the first drawbar orientation and the second grading blade orientation relative to a centerline of the grading machine.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 11A-11C are front views of the exemplary grading machine with various drawbar centershift positions, according to aspects of this disclosure.

FIGS. 17A and 17B are top views of the exemplary grading machine performing a machine turnaround mode, according to aspects of this disclosure.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

For the purpose of this disclosure, the term "ground surface" is broadly used to refer to all types of surfaces or earthen materials that may be worked in construction procedures (e.g., gravel, clay, sand, dirt, etc.) and/or can be cut, spread, sculpted, smoothed, leveled, graded, or otherwise treated. In this disclosure, unless stated otherwise, relative terms, such as, for example, "about," "substantially," and "approximately" are used to indicate a possible variation of ±10% in a stated value. Although the current disclosure is described with reference to a motor grader, this is only exemplary. In general, the current disclosure can be applied as to any machine, such as, for example, a plow, scraper, dozer, or another grading-type machine.

Figure 1:
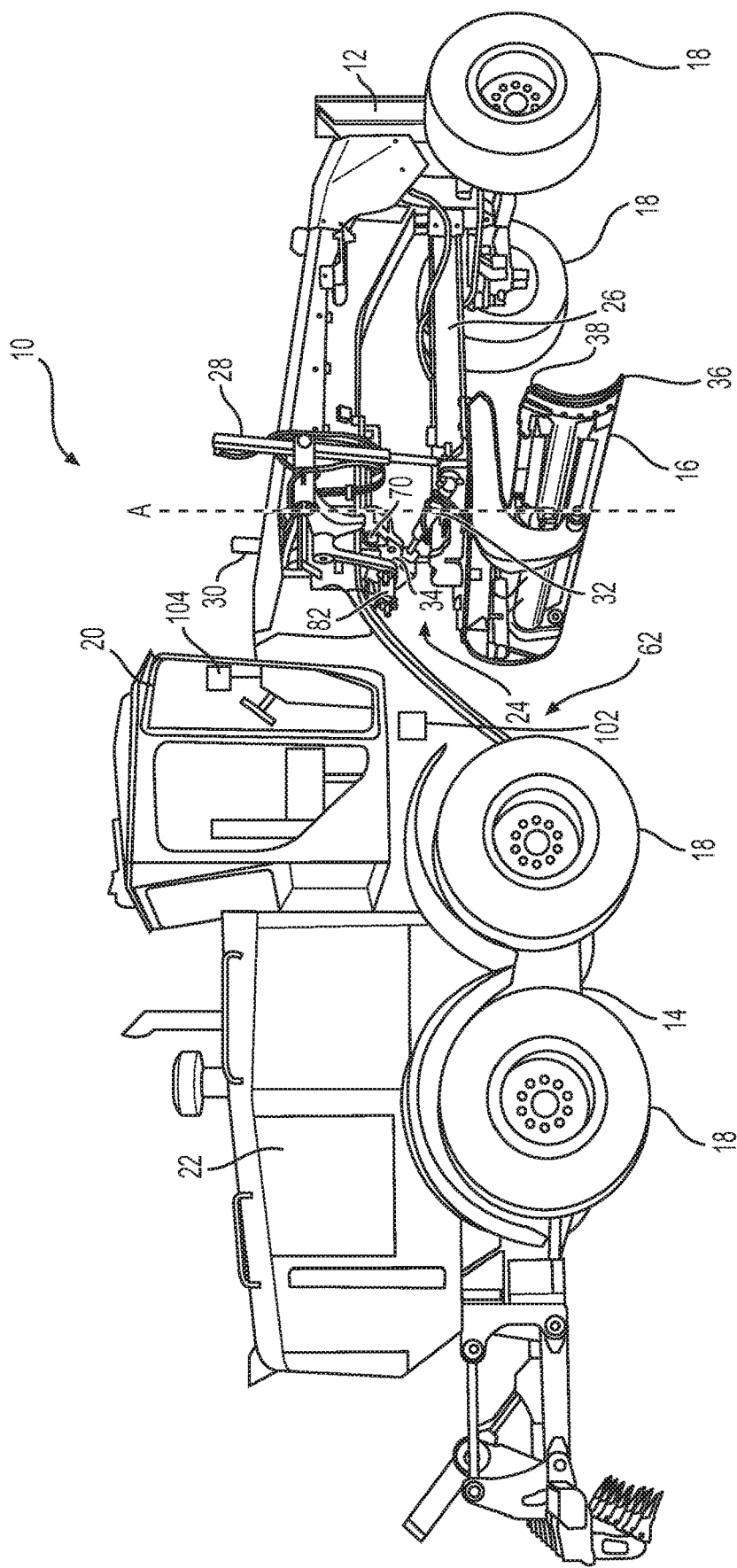
FIG. 1 is an illustration of an exemplary grading machine, according to aspects of this disclosure.

FIG. 1 illustrates a perspective view of an exemplary motor grader machine 10 (hereinafter "motor grader"), according to the present disclosure. Motor grader 10 includes a front frame 12, a rear frame 14, and a blade 16. Front frame 12 and rear frame 14 are supported by wheels 18. An operator cab 20 may be mounted above a coupling of front frame 12 and rear frame 14, and may include various controls, display units, touch screens, or user interfaces, for example, user interface 104, to operate or monitor the status of the motor grader 10. Rear frame 14 also includes an engine 22 to drive or power the motor grader 10. Blade 16, sometimes referred to as a moldboard, is used to cut, spread, or level (collectively "sculpt") earth or other material traversed by machine 10. As shown in greater detail in FIGS. 2A and 2B, blade 16 is mounted on a linkage assembly, shown generally at 24. Linkage assembly 24 allows blade 16 to be moved to a variety of different positions and orientations relative to motor grader 10, and thus sculpt the traversed material in different ways.

Additionally, a controller 102 may be in communication with one or more controls, for example. user interface 104, either in cab 20 (FIG. 1) or remote from motor grader 10. In one aspect, motor grader 10 may be an electrohydraulic motor grader, and controller 102 may control one or more electrical switches or valves in order to control one or more hydraulic cylinders or electrical elements in order to operate motor grader 10. As discussed in detail below, controller 102 may receive one or more operator inputs and accordingly control or position various components of motor grader 10.

Starting at the front of the motor grader 10 and working rearward toward the blade 16, linkage assembly 24 includes a drawbar 26. Drawbar 26 is pivotably mounted to the front frame 12 with a ball joint (not shown). The position of drawbar 26 may be controlled by hydraulic cylinders, including, for example, a right lift cylinder 28, a left lift cylinder 30, a centershift cylinder 32, and a linkbar 34. A height of blade 16 with respect to the surface being traversed below motor grader 10, commonly referred to as blade height, may be primarily controlled and/or adjusted with right lift cylinder 28 and left lift cylinder 30. Right lift cylinder 28 and left lift cylinder 30 may be controlled independently and, thus, may be used to tilt a bottom of blade 16, which includes a bottom cutting edge 36 and a top edge 38. Based on the positions of right lift cylinder 28 and left lift cylinder 30, cutting edge 36 may be tilted relative to the traversed material, so lift cylinders 28 and 30 may control a blade tilt. One or more blade tilt sensors 40 (e.g., inertial measurement units) may be mounted on or otherwise coupled to blade 16 in order to measure a vertical tilt of blade 16 from one end to another end relative to front frame 12.

Centershift cylinder 32 and linkbar 34 may be used primarily to shift a lateral position of drawbar 26, and any components mounted to drawbar 26, relative to front frame 12. This lateral shifting is commonly referred to as drawbar centershift. As discussed in more detail in FIG. 2C, centershift cylinder 32 may include a cylinder end 78 pivotably coupled to drawbar 26, and a rod end 80 pivotably coupled to linkbar 34. Linkbar 34 may include a plurality of position holes 70 for selectively positioning linkbar 34 to the left or right to allow for further shifting of drawbar 26 to a left or right side of the motor grader 10 by centershift cylinder 32. One or more drawbar centershift sensors 42 (e.g., inertial measurement units, linear position sensors on one or more cylinders, etc.) may be mounted on or otherwise coupled to centershift cylinder 32 (FIGS. 2A and 2B) or may be mounted on or otherwise coupled to drawbar 26 in order to measure a position of drawbar 26 relative to front frame 12. Furthermore, although not shown, each of right lift cylinder 28, left lift cylinder 30, and centershift cylinder 32 may include one or more position sensors operably coupled to the respective moving cylinders or rods to measure and communicate the extension or position of each cylinder, and thus a corresponding position or orientation of drawbar 26 and blade 16.

Figure 2A:
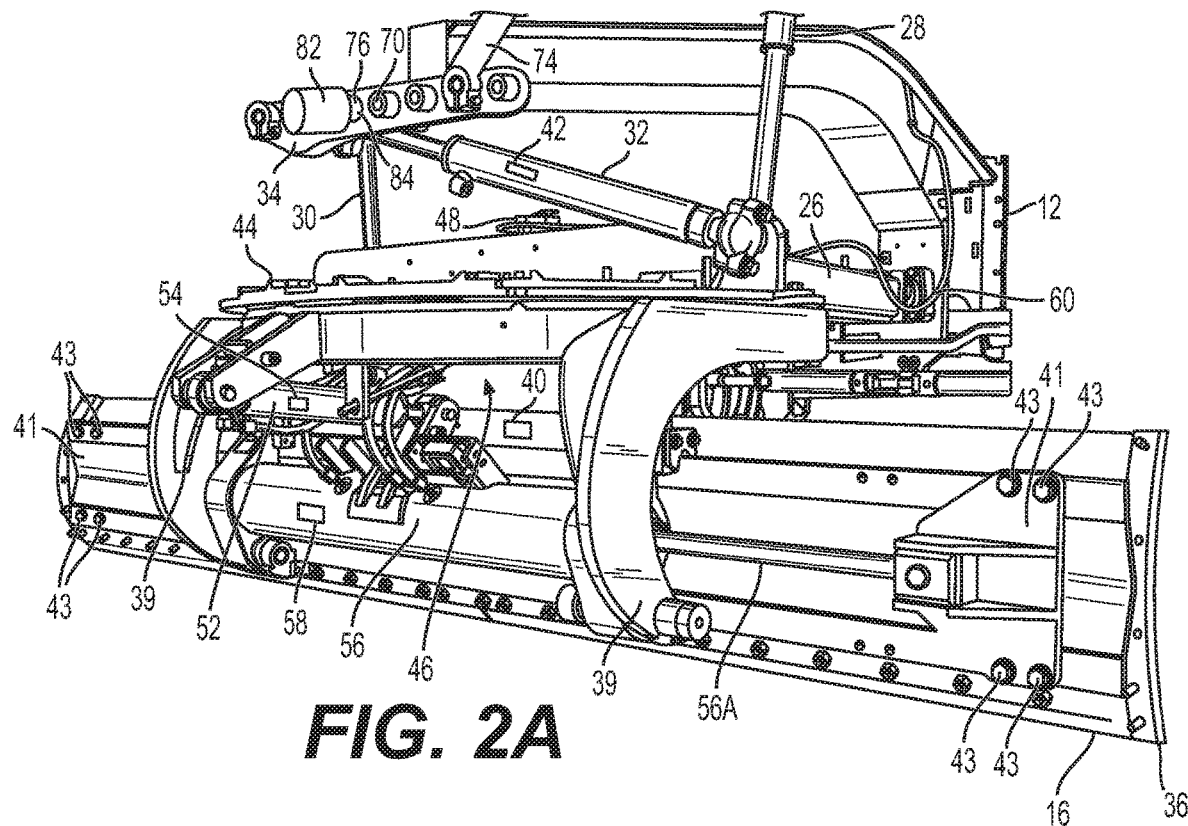
FIG. 2A is a rear perspective view of a grading portion of the grading machine of FIG. 1, according to aspects of this disclosure.
Figure 2B:
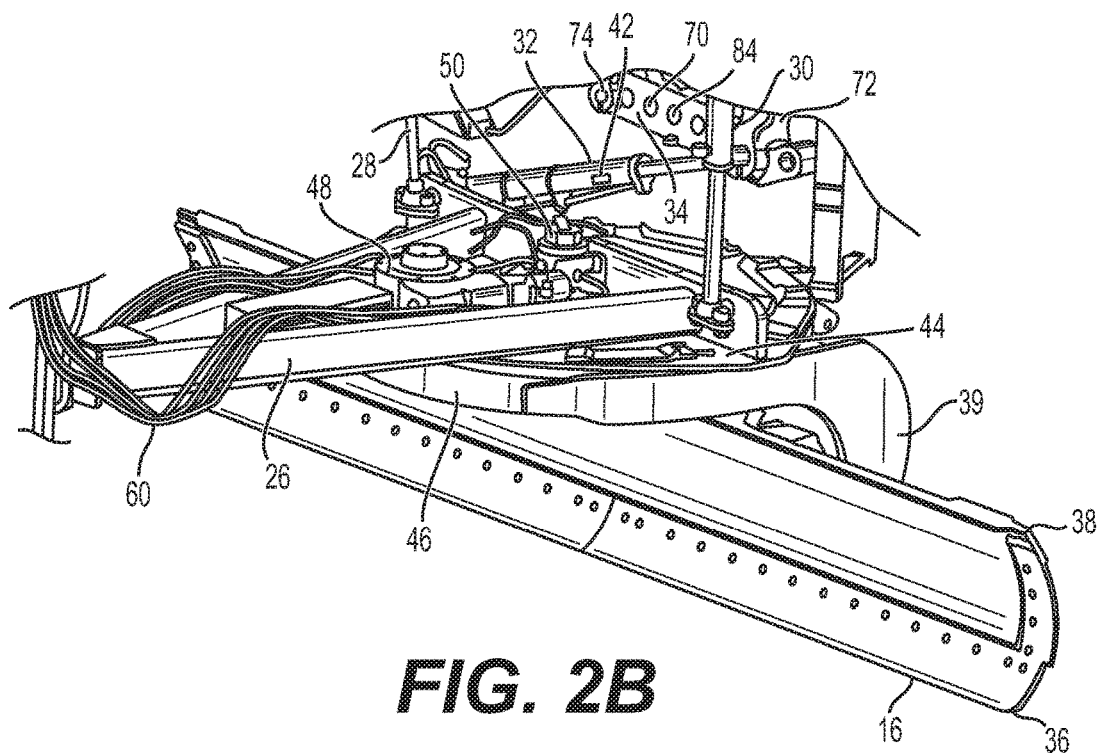
FIG. 2B is a front perspective view of the grading portion of the grading machine of FIG. 1, according to aspects of this disclosure.

Drawbar 26 includes a large, flat plate, commonly referred to as a yoke plate 44, as shown in FIGS. 2A and 2B. Beneath yoke plate 44 is a large gear, commonly referred to as a circle 46. Circle 46 may be rotated by a hydraulic motor, for example by a circle drive motor 48, as shown in FIG. 2B. The rotation of circle 46 by circle drive motor 48, commonly referred to as circle angle, pivots blade 16 about an axis A (FIG. 1) fixed to drawbar 24 to establish a blade cutting angle. The blade cutting angle is defined as the angle of blade 16 relative to front frame 12, and the blade cutting angle may be controlled by a combination of the position of circle 46 and the position of drawbar 26.

Circle 46 and blade 16 may be coupled via support arms 39 and support plate 41. Blade 16 may be coupled to support plate 41 by a plurality of removable screws 43, for example, in order to replace blade 16 or a portion of blade 16. Circle 46 and blade 16 may be rotated up to approximately 75 degrees clockwise or counterclockwise relative to front frame 12 about axis A. At a 0 degree blade cutting angle, blade 16 is arranged at a right angle to the front frame 12. Additionally, a circle angle sensor 50, for example, a rotary sensor, inertial measurement unit, etc., may be positioned on circle 46 to measure an angular rotation of circle 46, and thus an angle of blade 16. In one aspect, circle angle sensor 50 may be mounted in a centered position on circle 46. In another aspect, circle angle sensor 50 may be mounted in an off-centered position on circle 46, and circle angle sensor 50 or other internal components of motor grader 10 may be used to calculate the position of circle 46 and blade 16 based on a compensation or correction to account for the off-centered position of circle angle sensor 50. For example, circle 46 and blade 16 may be positioned at various angles in order to perform various grading operations, as discussed below with respect to FIGS. 4 and 5A-5D.

Blade 16 is pivotably mounted to circle 46, for example, with a portion of blade 16 being movable in a direction parallel to the surface being traversed and in a direction transverse to cutting edge 36 of blade 16. A blade pitch cylinder 52 may be coupled to top edge 38 of blade 16, and may be used to control or adjust a pitch of top edge 38 forward or backward. In other words, blade pitch cylinder 52 may be used to tip top edge 38 of blade 16 ahead of or behind cutting edge 36 of blade 16. The position of top edge 38 of blade 16 relative to cutting edge 36 of blade 16 is commonly referred to as blade pitch. In one aspect, blade pitch cylinder 52 may control a blade pitch of blade 16 within a range of 45 degrees, for example, from a position of negative five degrees with top edge 38 behind cutting edge 36, to a position of positive 40 degrees with top edge 38 ahead of cutting edge 36. Additionally, a blade pitch sensor 54, for example, an inertial measurement unit, may be positioned on blade 16, for example, on top edge 38. In other aspects, one or more blade pitch sensors 54 may include a rotary sensor on blade 16 or a linear displacement sensor coupled to blade pitch cylinder 52. Blade pitch sensor 54 may detect the blade pitch, and blade 16 may be positioned in various blade pitches in order to perform various grading operations, as discussed below with respect to FIGS. 6 and 7A-7C.

Blade 16 may be mounted to drawbar 26 and/or circle 46 via a sliding joint. For example, a sideshift cylinder 56 and sideshift rod 56A may control the position of blade 16 relative to drawbar 26 and/or circle 46. Sideshift cylinder 56 may be positioned between support arms 39, and support rod 56A may be coupled to support plate 41. Thus, driving sideshift rod 56A relative to sideshift cylinder 56 slides or shifts blade 16 from side to side relative to drawbar 26 and circle 46. This side to side shift is commonly referred to as blade sideshift. Additionally, a blade sideshift sensor 58 (e.g., a linear displacement sensor) may be coupled to sideshift cylinder 56 to measure a position of sideshift cylinder 56, and thus of blade 16, relative to drawbar 26 and circle 46. For example, sideshift cylinder 56 and blade 16 may be positioned at various sideshift positions in order to perform various grading operations, as discussed below with respect to FIGS. 8, 9A, and 9B.

Figure 2C:
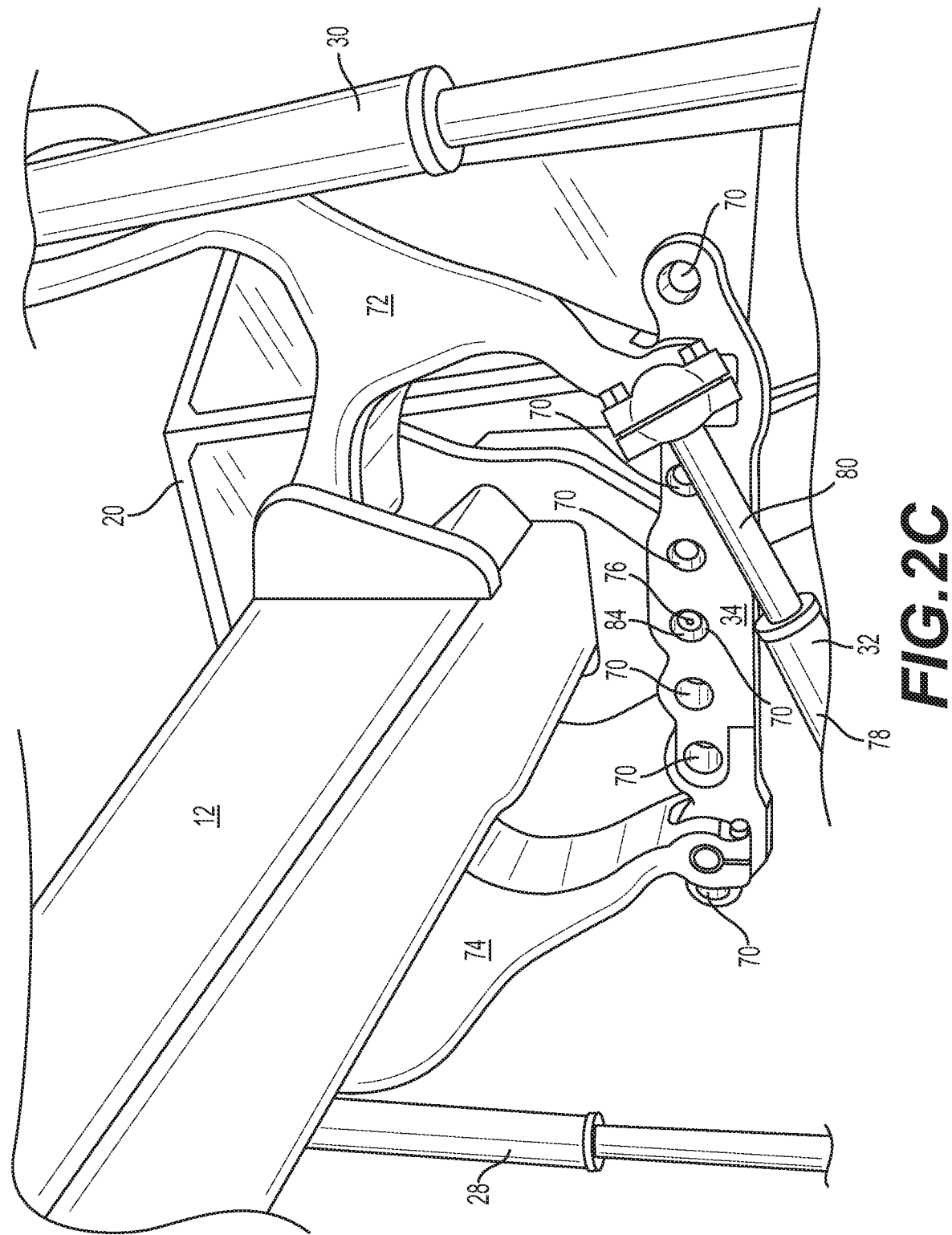
FIG. 2C illustrates an enlarged view of the linkbar system of the grading machine of FIG. 1, according to aspects of this disclosure.

As shown in FIGS. 1 and 2A-2C, linkbar 34 is a generally straight member that includes a plurality of position holes 70 extending therethrough. Linkbar 34 is secured to both front frame 12 and drawbar 26. For example, as best shown in FIG. 2C, linkbar 34 may be secured to front frame 12 by left and right lift cylinder arms 72, 74 and a linkbar pin 76. Left and right lift cylinder arms 72, 74 are fixedly and pivotably secured to both the front frame 12 and to the linkbar 34 at outer position holes 70 of linkbar 34. Linkbar pin 76 extends through one of the position holes 70 of linkbar 34 to form a fulcrum for linkbar 34. As noted above, centershift cylinder 32 may couple linkbar 34 to drawbar 26 by a cylinder end 78 pivotably coupled to drawbar 26, and a rod end 80 of centershift cylinder 32 pivotably coupled to an outer position hole 70 of linkbar 34.

Linkbar pin 76 is controllable by a pin actuator 82 (FIG. 2A), such as a hydraulic or solenoid actuator, to extend and retract so as to allow for shifting of the fulcrum of the linkbar 34 to the left or right via engaging the linkbar pin 76 into different position holes 70 of linkbar 34. For example, during more standard motor grader operations where the blade 16 is generally centrally located under the motor grader 10, linkbar pin 76 may extend into the center-most position hole 84 of the linkbar 34 to form a centrally located fulcrum of linkbar 34. However, some modes of motor grader 10 may require the blade 16 to extend significantly to one side of the motor grader 10. In these situations, (1) the linkbar pin 76 can be retracted out from the centrally located position hole 84, (2) the linkbar 34 can be shifted to a side by movement of the centershift cylinder 32 and in some instances movement of lift cylinders 28, 30, and (3) the linkbar pin 76 can be extended into a new a new position hole 70 that is to one side of the centrally located position hole 84. The position of the linkbar 34, corresponding to which position hole the linkbar pin 76 is engaging, can be determined by any conventional linkbar position sensor 86, such as an IMU as discussed herein. As will be discussed in more detail below, this side shifting of the linkbar 34 can be done automatically at the request of the operator or automatically as part of an automatic mode movement.

Furthermore, various portions of motor grader 10 may be adjusted simultaneously or in combination in order for motor grader 10 to perform various operations. For example, one or more of right lift cylinder 28, left lift cylinder 30, centershift cylinder 32, linkbar 34, circle drive motor 48, blade pitch cylinder 52, and sideshift cylinder 56 may be actuated or shifted in order to position one or more of blade 16 and drawbar 26, as discussed below with respect to FIGS. 10-17B.

As shown in FIGS. 1, 2A, and 2B, motor grader 10 may include a plurality of hydraulic lines 60 in order to control the hydraulic cylinders. Motor grader 10 may include a hydraulic pump (not shown). The hydraulic pump may supply high pressure hydraulic fluid through one or more of hydraulic lines 60 to one or more of the hydraulic cylinders. A low pilot pressure may be provided by a hydraulic pressure reducing valve, which can receive the high pressure hydraulic fluid and supply low pilot pressure to each hydraulic cylinder. Additionally, each hydraulic cylinder may include an electrical solenoid and one or more hydraulic valves. The solenoid may receive one or more signals from controller 102 to control and position each hydraulic cylinder by configuring the flow of hydraulic fluid through the valves. The delivery of the hydraulic fluid may be controlled by controller 102, for example, via one or more user interfaces 104.

Additionally, front frame 12 and rear frame 14 may be articulated relative to one another during operation of motor grader 10 at a pivotable coupling or linkage 62, for example, below cab 20. Although not shown, articulation cylinders may be mounted on the left and right sides of rear frame 14, and may be used to articulate (or rotate) front frame 12. With front frame 12 and rear frame 14 aligned, as shown in FIGS. 1, 9A, 9B, 17A, and 17B, motor grader 10 is positioned in a neutral or zero articulation angle. Various other articulation angles may be used when grading inclined or banked surfaces or when forming inclined or banked surfaces (i.e., ditches). Although not specifically discussed herein, it is further contemplated that a control system 100 (FIG. 3) may allow an operator to monitor an articulation between front frame 12 and rear frame 14, for example, via sensors on the articulation cylinders. Furthermore, user interface 104 may allow the operator to select one or more predetermined articulation positions, and controller 102 may signal one or more actuators coupled to the articulation cylinders to position the articulation cylinders, and thus position front frame 12 relative to rear frame 14.

Figure 3:
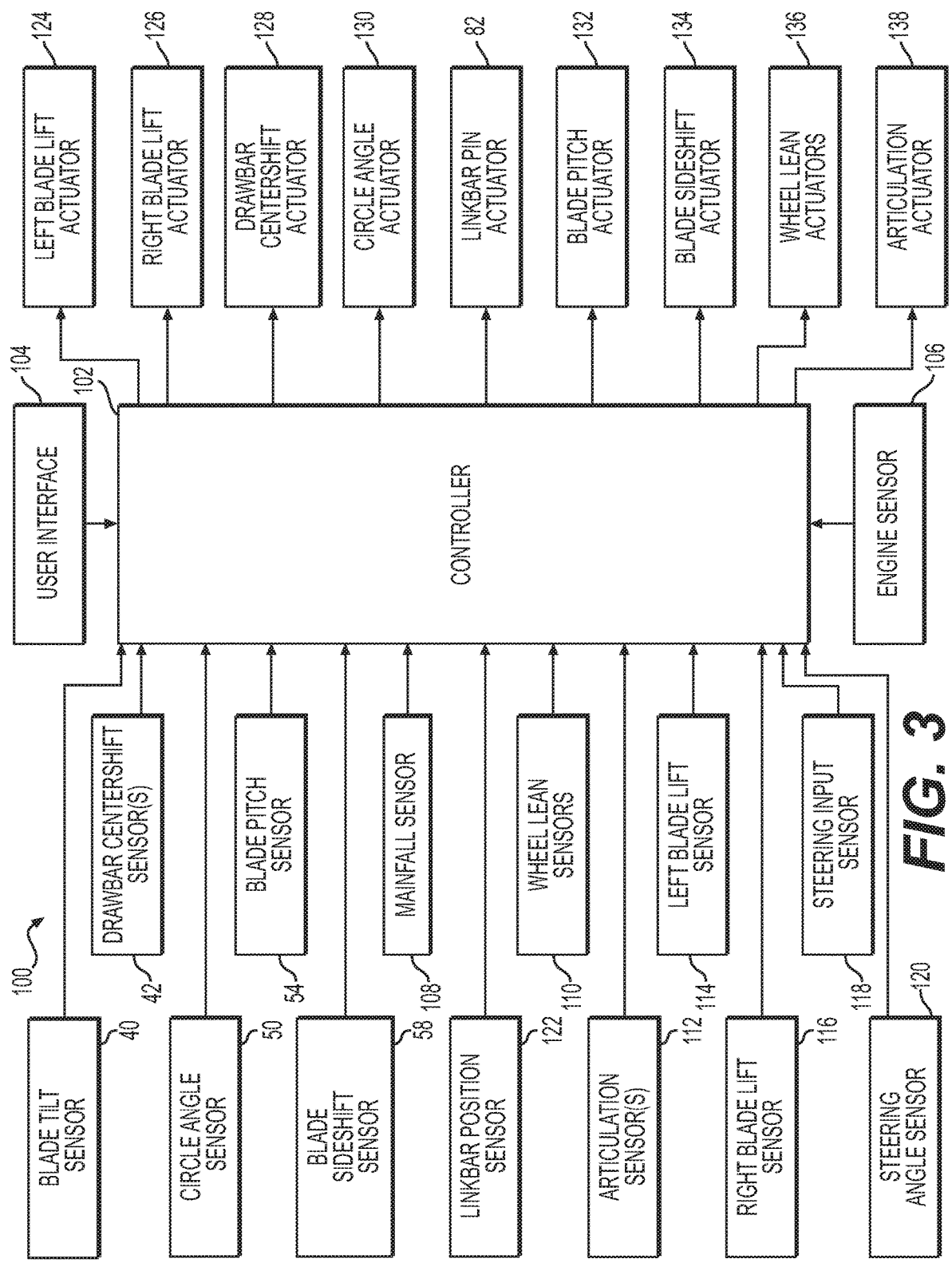
FIG. 3 illustrates a schematic view of a portion of a control system for the exemplary grading machine of FIG. 1, according to aspects of this disclosure.

FIG. 3 illustrates an exemplary schematic view of a control system 100 of motor grader 10. Control system 100 may include one or more controllers 102 in communication with a plurality of sensors, one or more controls or user interfaces 104, one or more engine sensors 106 (i.e., gear sensor, speed sensor, etc.), and a plurality of actuators. The communication may be wired or wireless, for example, via Bluetooth®, Wi-Fi, radio frequency, etc.

As shown in FIG. 3, and as discussed above, control system 100 may include blade tilt sensor 40, drawbar centershift sensor 42, circle angle sensor 50, blade pitch sensor 54, and sideshift sensor 58. Additionally, control system 100 may include a mainfall sensor 108 that measures an angle or pitch of motor grader 10. Control system 100 may include one or more wheel lean sensors 110 coupled to wheels 18 or other portions of the wheels to measure a wheel lean of one or more wheels 18. Control system 100 may include one or more articulation sensors 112 coupled to front frame 12 and/or rear frame 14 to measure an articulation between front frame 12 and rear frame 14. Furthermore, control system 100 may include one or more left blade lift sensors 114 and one or more right blade lift sensors 116. Left and right blade lift sensors 114 and 116 are respectively coupled to left lift cylinder 30 and right lift cylinder 28 (FIG. 1), and may confirm or otherwise be related to a measured blade tilt, for example, via blade tilt sensor 40. It is understood that each of these sensors and any other sensor discussed herein may be an inertial measurement unit mounted on one or more components, an angular position or rotary sensor mounted on one or more components, a linear displacement sensor coupled to the moving cylinder or rod of a hydraulic sensor, or any other suitable sensor.

In addition, control system 100 may include a steering input sensor 118, which may be coupled to a steering wheel, joystick, or other control mechanism for steering motor grader 10. Based on the sensed input via steering input sensor 118, controller 102 may signal one or more actuators to control the steering, articulation, wheel lean, etc. of motor grader 10. Control system 100 may also include a steering angle sensor 120, which may measure an actual steering angle or direction of motor grader 10.

As noted above, control system 100 may also include a linkbar position sensor 122 that senses the position of the linkbar 34, and in particular, the current position of the linkbar 34 corresponding to which position hole 70 currently receives the linkbar pin 76. Controller 102 may also be coupled to linkbar pin actuator 82 that controls the extension and retraction of the linkbar pin 76 during side shifting of the linkbar 34.

Based on information from the aforementioned sensors, and as mentioned above, controller 102 may be in communication with a plurality of actuators. Each of the actuators discussed herein may be a control valve for the respective hydraulic cylinder, an electric actuator, or any suitable actuator. Moreover, the actuators may include various combinations of the aforementioned actuators. For example, controller 102 may be in communication with one or more left blade lift actuators 124 and one or more right blade lift actuators 126. Left and right blade lift actuators 124 and 126 control the positions of left and right lift cylinder 28 and 30, and thus control an angle of blade 16. Moreover, controller 102 may be in communication with one or more drawbar centershift actuators 128, which may control a position of centershift cylinder 32.

Controller 102 may be in communication a circle angle actuator 130, which may control circle drive motor 48. Controller 102 may also be in communication with a blade pitch actuator 132, which may control blade pitch cylinder 52. In addition, controller 102 may be in communication with a blade sideshift actuator 134, which may control sideshift cylinder 56.

Controller 102 may further be in communication with one or more wheel lean actuators 136, which may control a wheel lean of wheels 18 coupled to front frame 12 and rear frame 14. Controller 102 may also be in communication with an articulation actuator 138, which may control one or more articulable connections between front frame 12 and rear frame 14 to control the articulation of motor grader 10.

Although only a number of sensors, actuators, and inputs are discussed with respect to FIG. 3, this disclosure is not so limited. Rather, control system 100 may include additional sensors and actuators in communication with controller 102 in addition to the sensors and actuators mentioned above in order to measure and control various aspects of motor grader 10. Furthermore, based on the information from the plurality of sensors and/or based on operator inputs or controls, controller 102 may automatically signal one or more the actuators to control various portions of motor grader 10. For example, controller 102 may determine a first position and/or a first orientation of blade 16 based on the information received from one or more of blade tilt sensor 40, circle angle sensor 50, blade pitch sensor 54, sideshift sensor 58, left blade lift sensor 114, and right blade lift sensor 116. As discussed in greater detail below, for example, with respect to FIGS. 18 and 19, based on operator input or selection of a particular mode of operation (i.e., via user interface 104), controller 102 may adjust blade 16 from the first position and/or first orientation to a second position and/or a second orientation by signaling one or more of left blade lift actuator 124, right blade lift actuator 126, drawbar centershift actuator 128, circle angle actuator 130, blade pitch actuator 132, or blade sideshift actuator 134. Controller 102 may also direct, steer, articulate, or otherwise control motor grader 10.

Figure 4:
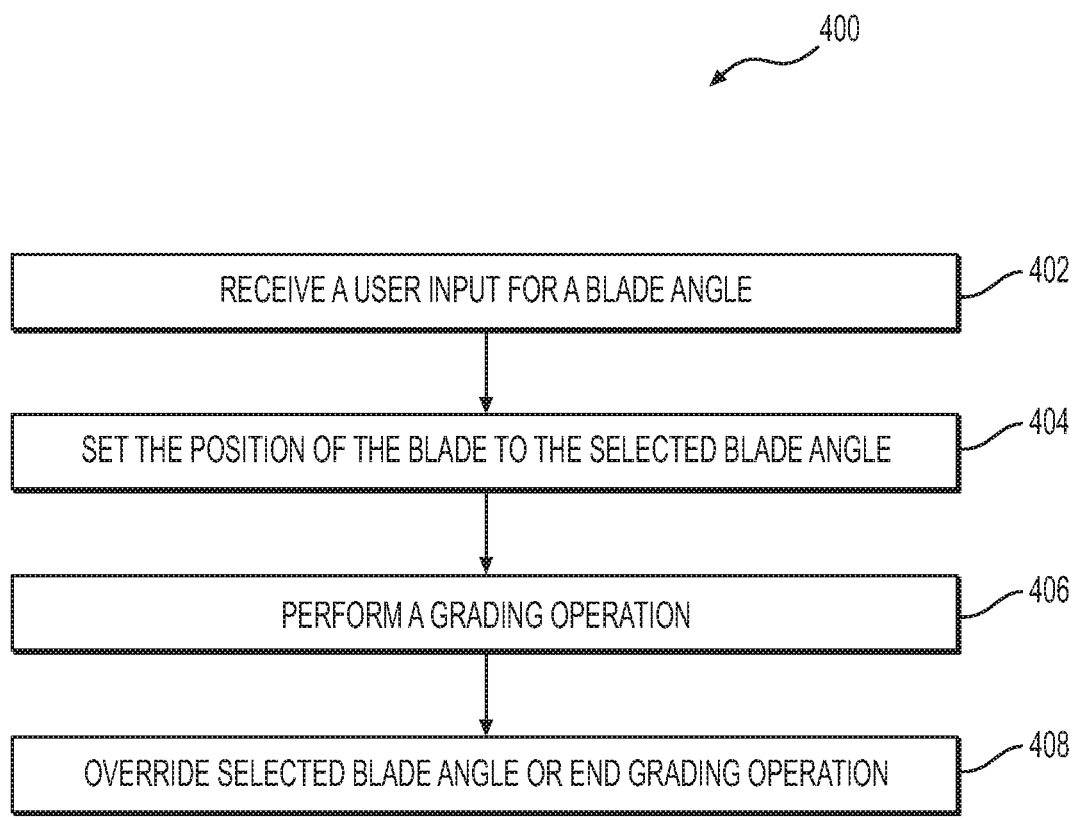
FIG. 4 provides a flow chart depicting an exemplary method for controlling a circle angle of a grading machine, according to aspects of this disclosure.

FIGS. 4 and 5A-5D illustrate various aspects of this disclosure related to adjusting the angle of blade 16. For example, FIG. 4 is a flow diagram portraying an exemplary blade angle adjustment method 400 that may be performed by control system 100 to position blade 16. Method 400 includes a step 402, where machine 10 may receive an operator input (e.g., through user interface 104) to position blade 16 in one of a plurality of predetermined blade angles. The predetermined blade angles may be stored in a memory of controller 102 and transmitted to user interface 104. For example, user interface 104 may include a blade angle icon displayed on a home screen for a blade angle selection mode. An operator may select the blade angle selection mode, and user interface 104 may then display the plurality of predetermined blade angles, for example, with individual selectable icons. Alternatively, the blade angle selection mode may allow an operator to numerically input a specific blade angle. The selected blade angle may be transmitted from user interface 104 to controller 102 (FIG. 3).

In a step 404, motor grader 10 may set the position of blade 16 to the selected blade angle. For example, controller 102 may receive information from circle angle sensor 50 related to the current position of circle 46, and thus the current angle of blade 16 (assuming drawbar 24 is aligned with front frame 12). If there is a difference between the current angle of blade 16 and the selected blade angle, controller 102 may signal circle angle actuator 130 to adjust the position of circle 46 (e.g., by actuating circle drive motor 48) such that blade 16 is positioned in the selected blade angle. Step 404 may also include indicating on user interface 104 that blade 16 has been positioned in the selected blade angle.

In a step 406, motor grader 10 may perform a grading operation. Step 406 may include receiving an operator input, for example, via user interface 104, a joystick, pedal, etc., to advance along a path. The path may be pre-programmed or operator controlled (e.g., via a steering wheel). During the grading operation, step 406 may include monitoring the blade angle via circle angle sensor 50 to ensure that blade 16 maintains the selected blade angle during the grading operation. For example, if circle angle sensor 50 detects a position of circle 46 other than the position that corresponds to the selected blade angle, controller 102 may signal circle angle actuator 130 to operate circle drive motor 48 to return circle 46 to the appropriate position.

In a step 408, the operator may override the selected blade angle or end the grading operation. For example, controller 102 may indicate an error or warning condition, or the operator may repeat step 402 and select a different blade angle from the plurality of predetermined blade angles, may activate a manual control, may deactivate motor grader 10, etc.

Figure 5A:
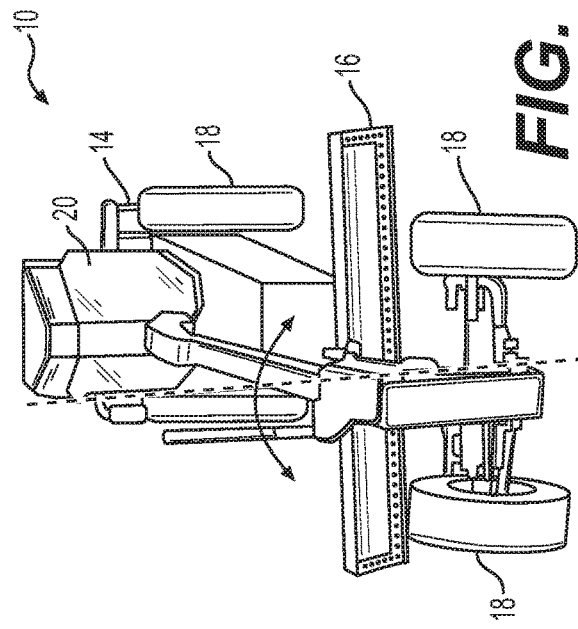
FIGS. 5A-5D are perspective views of the exemplary grading machine with various circle angle positions, according to aspects of this disclosure.
Figure 5B:
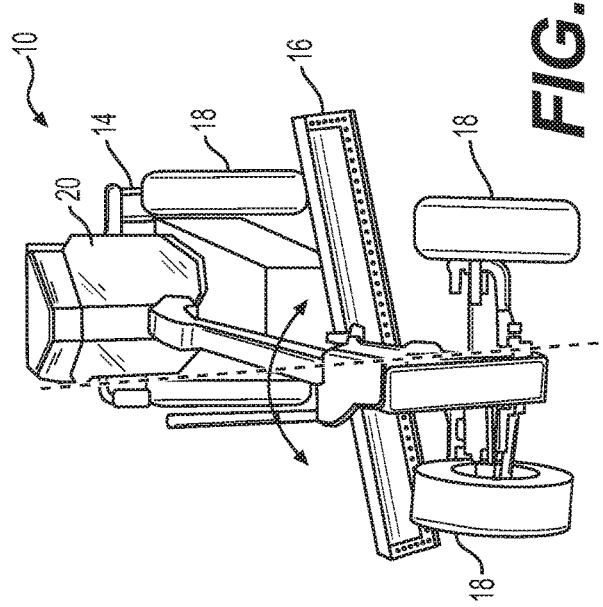
Figure 5C:
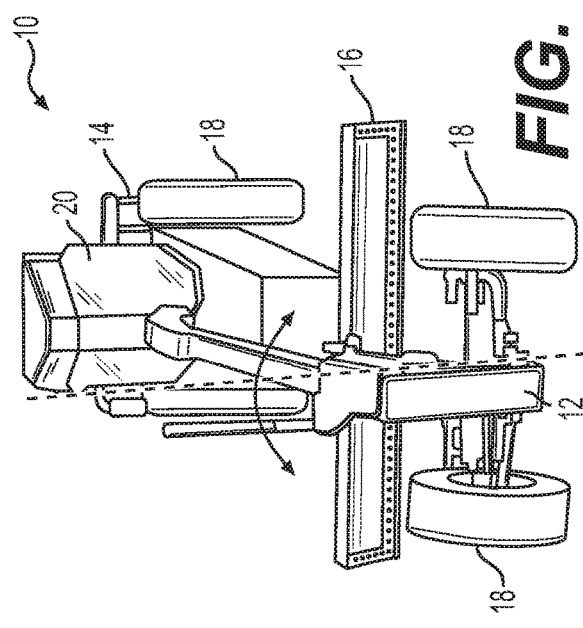
Figure 5D:
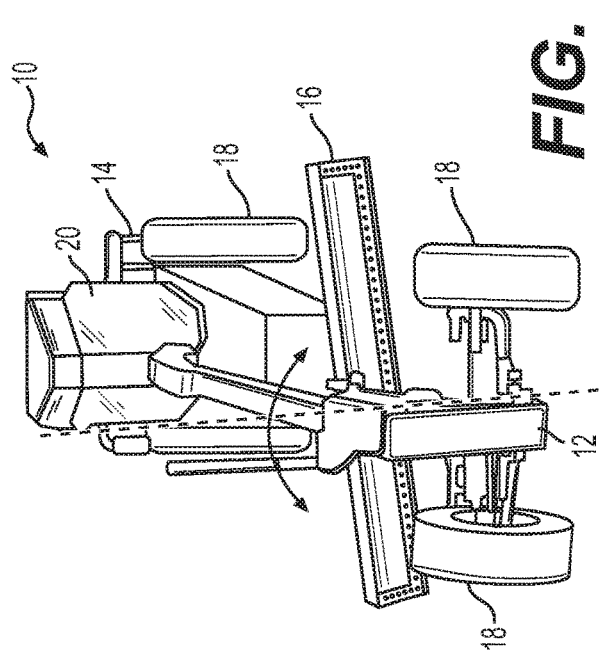

FIGS. 5A-5D are perspective views of motor grader 10 with various blade angles. It is noted that various components of motor grader 10 are omitted in FIGS. 5A-5D for clarity. In FIG. 5A, blade 16 is positioned at an angle of approximately 0 to 10 degrees. The blade angle of FIG. 5A may correspond to a spreading operation (e.g., gravel, dirt, etc.). In FIG. 5B, blade 16 is positioned at an angle of approximately 10 to 30 degrees. The blade angle of FIG. 5B may correspond to a light grading operation. In FIG. 5C, blade 16 is positioned at an angle of approximately 30 to 45 degrees. The blade angle of FIG. 5C may correspond to a moderate or finish grading operation. In FIG. 5D, blade 16 is positioned at an angle of approximately 60 degrees. The blade angle of FIG. 5D may correspond to an aggressive grading or cutting operation. The blade angles shown in FIGS. 5A-5D may be displayed on user interface 104 with selectable icons or images of their configurations, words descriptive of the various functions (e.g., "spreading," "light grading," "finish grading," "cutting," etc.), or other indicators. As mentioned above, circle 46, and thus blade 16, may be positioned at any number of operator-defined positions, for example, via user interface 104. Furthermore, circle angle sensor 50 (FIG. 2B) may help to prevent blade 16 from being positioned at such an angle where blade 16 may contact or otherwise interfere with wheels 18. For example, circle angle sensor 50 is in communication with controller 102, and may indicate a warning if the operator-defined position would position blade 16 at an angle where blade 16 may contact wheels 18 or other portions of motor grader 10. In one aspect, circle angle sensor 50 and controller 102 may prevent circle angle actuator 130 and circle drive motor 48 from positioning circle 46 at a position where blade 16 may contact wheels 18 or other portions of motor grader 10.

Figure 6:
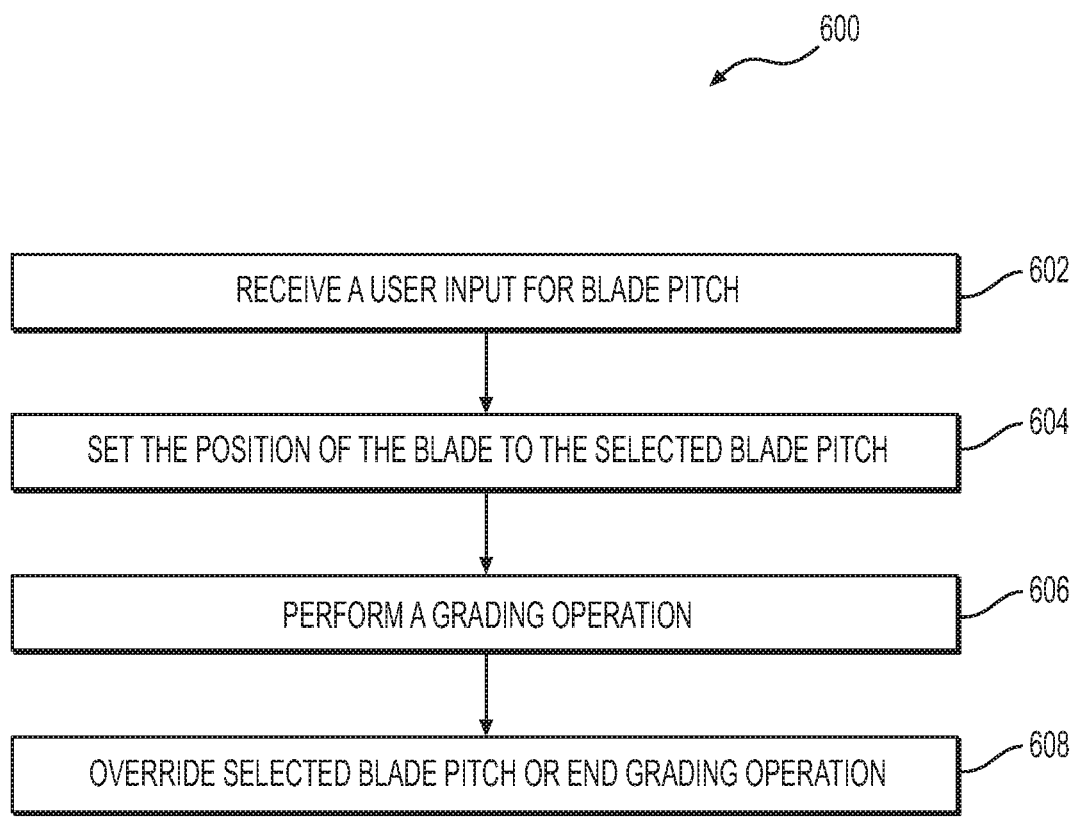
FIG. 6 provides a flow chart depicting an exemplary method for controlling a blade pitch of a grading machine, according to aspects of this disclosure.

FIGS. 6 and 7A-7C illustrate various aspects of this disclosure related to adjusting the pitch of blade 16. For example, FIG. 6 is a flow diagram portraying an exemplary blade pitch adjustment method 600 that may be performed by control system 100 to position blade 16. Method 600 includes a step 602, where machine 10 may receive an operator input (e.g., through user interface 104) to position blade 16 in one of a plurality of predetermined blade pitches. For example, user interface 104 may include a blade pitch icon displayed on a home screen for a blade pitch selection mode. An operator may select the blade pitch selection mode, and user interface 104 may then display the plurality of predetermined blade pitches, for example, with individual selectable icons. The predetermined blade pitches may be stored in the memory of controller 102 and transmitted to user interface 104. Alternatively, the blade pitch selection mode may allow an operator to numerically input a specific blade pitch. The selected blade pitch may be transmitted from user interface 104 to controller 102 (FIG. 3).

In a step 604, motor grader 10 may set the position of blade 16 to the selected blade pitch. For example, controller 102 may receive information from blade pitch sensor 54 related to the current orientation of blade 16, and thus the current pitch of blade 16. If there is a difference between the current pitch of blade 16 and the selected blade pitch, controller 102 may signal blade pitch actuator 132 to adjust the blade pitch cylinder 52 such that blade 16 is positioned in the selected blade pitch. Step 604 may also include indicating on user interface 104 that blade 16 has been positioned in the selected blade pitch.

In a step 606, motor grader 10 may perform a grading operation. Step 606 may include receiving an operator input, for example, via user interface 104, a joystick, pedal, etc., to advance along a path. The path may be pre-programmed or operator controlled (e.g., via a steering wheel). During the grading operation, step 606 may include monitoring the blade pitch via blade pitch sensor 54 to ensure that blade 16 maintains the selected blade pitch during the grading operation. For example, if blade pitch sensor 54 detects an orientation of blade 16 other than the position that corresponds to the selected blade pitch, controller 102 may signal blade pitch actuator 132 to operate blade pitch cylinder 52 to return blade 16 to the appropriate orientation.

In a step 608, the operator may override the selected blade pitch or end the grading operation. For example, controller 102 may indicate an error or warning condition, or the operator may repeat step 602 and select a different blade pitch from the plurality of predetermined blade pitches, may activate a manual control, may deactivate motor grader 10, etc.

Figure 7A:
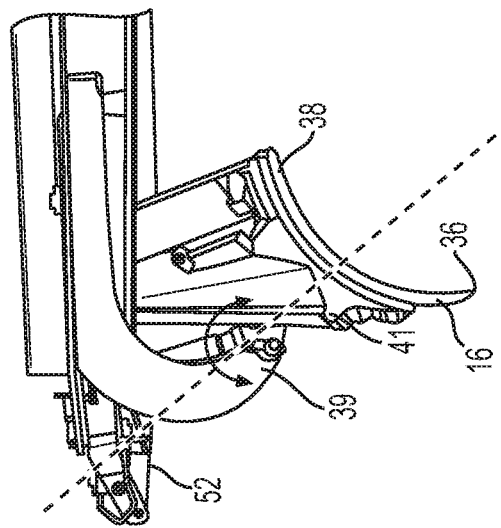
FIGS. 7A-7C are side views of the grading portion of the grading machine with various blade pitch positions, according to aspects of this disclosure.
Figure 7B:
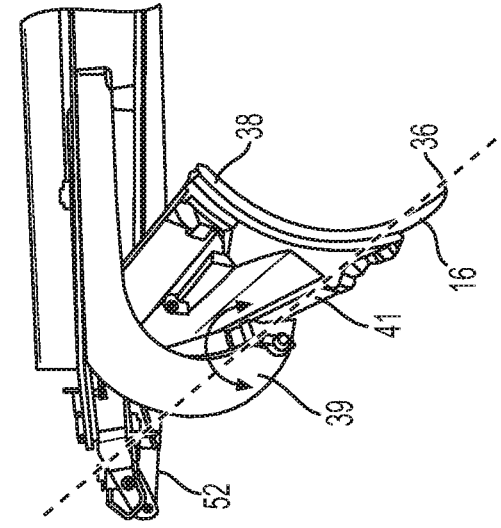
Figure 7C:
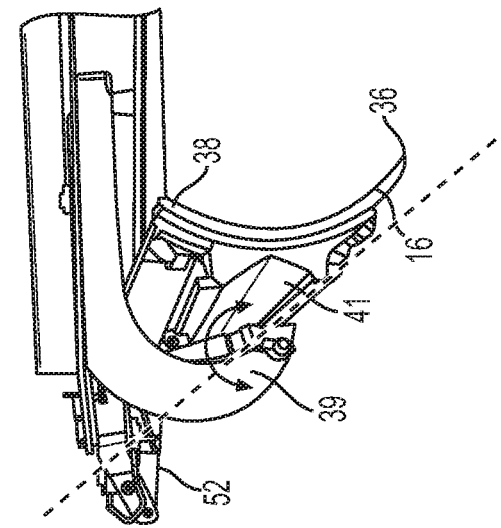

FIGS. 7A-7C are side views of blade 16 with various blade pitches. It is noted that various components of motor grader 10 are omitted in FIGS. 7A-7C for clarity. The blade pitches shown in FIGS. 7A-7C may be displayed on user interface 104 with selectable icons or images of the configurations, words descriptive of the various functions (e.g., spreading, grading, cutting, etc.), or other indicators. As mentioned above, blade pitch cylinder 52, and thus blade 16, may be positioned in any number of operator-defined positions, for example, via user interface 104. Furthermore, as discussed below, blade 16 may be laterally movable relative to blade pitch cylinder 52, for example, blade pitch cylinder 52 may be coupled to a top portion of blade 16 via a peg in slot configuration. In such a configuration, blade 16 may be laterally movable relative to blade pitch cylinder 52, and blade pitch cylinder 52 may control the pitch of blade 16 with blade 16 in any lateral position.

Blade 16 is supported by support arms 39 and support plate 41, and includes a blade pitch that is controlled via blade pitch cylinder 52. Although not shown, blade 16 and/or blade pitch cylinder 52 may also include blade pitch sensor 54, as discussed above. In FIG. 7A, blade 16 is positioned in a rolled back position, which may correspond to a spreading operation. The rolled back position may include a blade pitch of approximately negative five degrees, with top edge 38 being approximately one inch behind cutting edge 36. The rolled back position may be used to spread gravel, dirt, rocks, etc., and may correspond to a lower amount of wear on cutting edge 36.

FIG. 7B illustrates blade 16 with a blade pitch of approximately ten degrees forward, which may correspond to a general or neutral grading position. In this configuration, top edge 38 may be approximately two inches forward of cutting edge 36. This position may be used in a finish grading operation and may help to promote efficient rolling of the material being graded by positioning cutting edge 36 approximately parallel to the surface being traversed. This position may be the optimum position for most grading operations, and may result in a moderate amount of wear on cutting edge 36.

In FIG. 7C, blade 16 is positioned with a blade pitch of approximately 40 degrees forward, which may correspond to an aggressive or forward grading position. In this configuration, top edge 38 may be well ahead of cutting edge 36, and cutting edge 36 may be approximately perpendicular to the surface being traversed. This position may correspond to a cutting operation, and may help blade 16 to penetrate hard packed material and/or shave off hard spots of material on the surface being traversed. The cutting operation with blade 16 in the blade pitch orientation of FIG. 7C may result in a higher amount of wear on cutting edge 36. Blade pitch cylinder 52, and thus blade 16, may be positioned at any number of operator-defined positions. As discussed above, blade pitch sensor 54 may detect a blade pitch in order to confirm that blade 16 maintains the selected or operator-defined blade pitch, and controller 102 and blade pitch actuator 132 may adjust blade pitch cylinder 52 as necessary to position or maintain the selected blade pitch.

Figure 8:
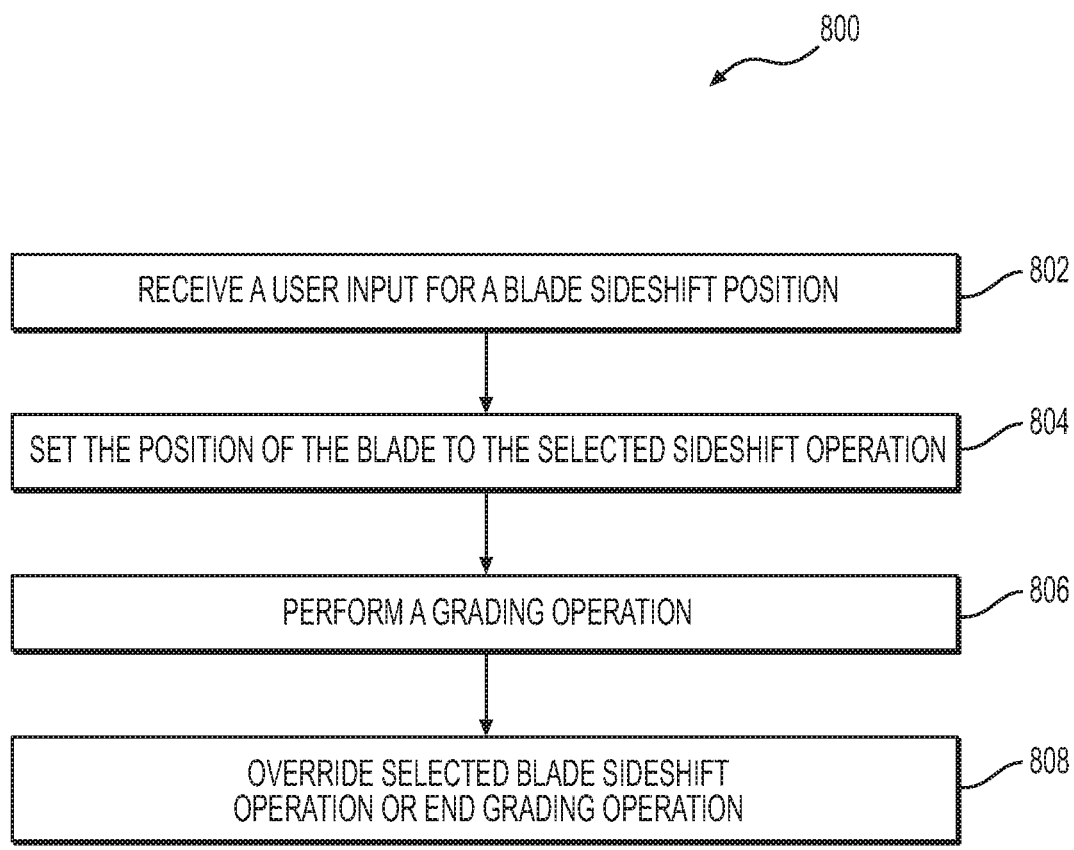
FIG. 8 provides a flow chart depicting an exemplary method for controlling a blade sideshift of a grading machine, according to aspects of this disclosure.
Figure 9A:
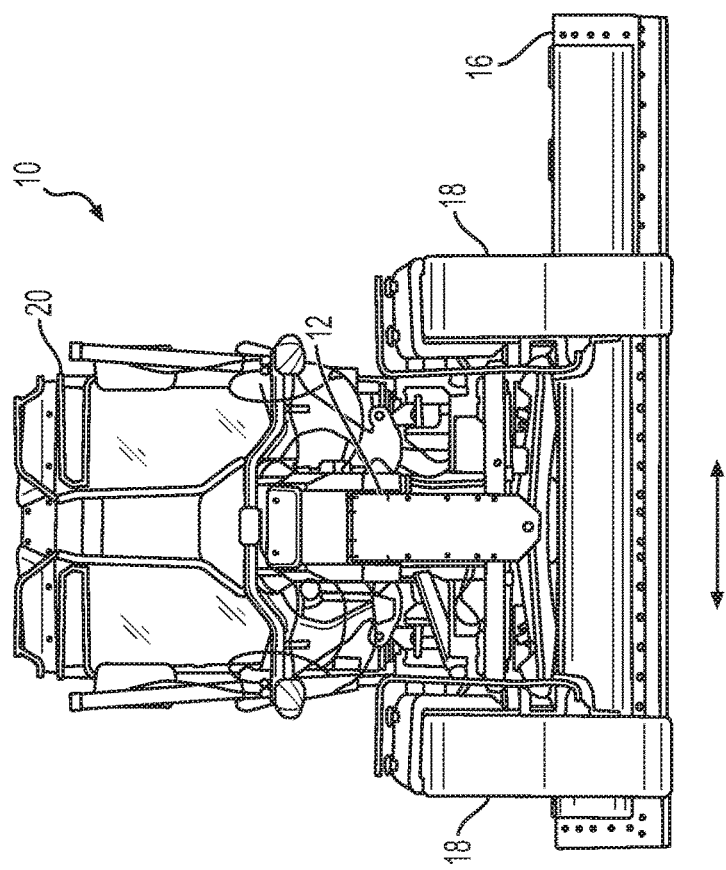
FIGS. 9A and 9B are front views of the exemplary grading machine with various blade sideshift positions, according to aspects of this disclosure.
Figure 9B:
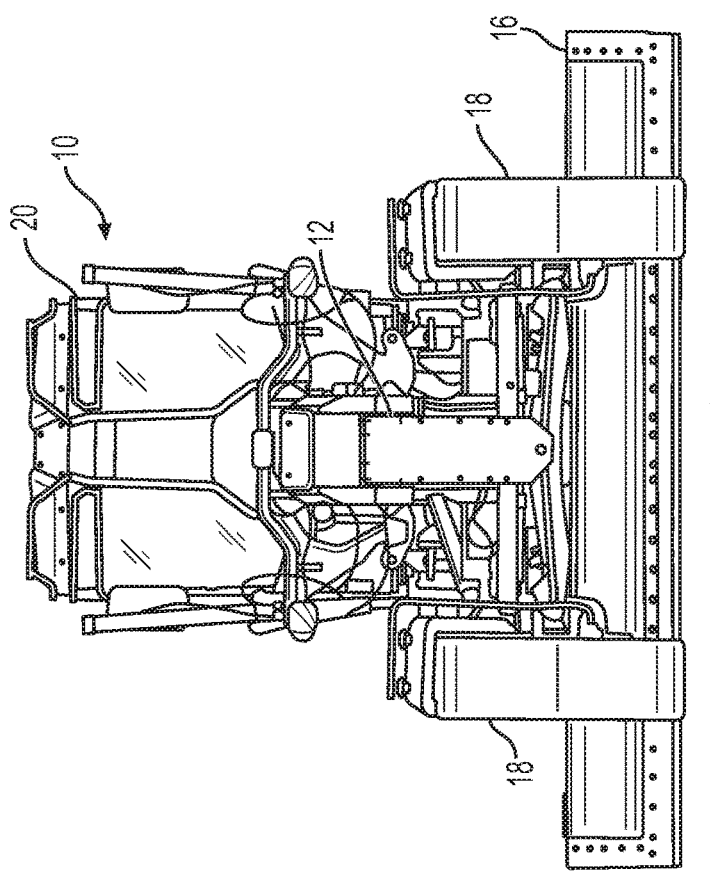

FIGS. 8, 9A, and 9B illustrate various aspects of this disclosure related to adjusting the sideshift of blade 16. For example, FIG. 8 is a flow diagram portraying an exemplary blade sideshift adjustment method 800 that may be performed by control system 100 to position blade 16. Method 800 includes a step 802, where machine 10 may receive an operator input (e.g., through user interface 104) to position blade 16 in one of a plurality of predetermined blade sideshift positions. The predetermined blade sideshift positions may be stored in the memory of controller 102 and transmitted to user interface 104. For example, user interface 104 may include a blade sideshift icon displayed on a home screen for a blade sideshift selection mode. An operator may select the blade sideshift selection mode, and user interface 104 may then display the plurality of predetermined blade sideshift positions, for example, with individual selectable icons. Alternatively, the blade sideshift selection mode may allow an operator to input a specific blade sideshift position. The selected blade sideshift position may be transmitted from user interface 104 to controller 102 (FIG. 3).

In a step 804, motor grader 10 may set the position of blade 16 to the selected blade sideshift position. For example, controller 102 may receive information from blade sideshift sensor 58 related to the current position of blade 16, and thus the current sideshift position of blade 16. If there is a difference between the current position of blade 16 and the selected blade sideshift position, controller 102 may signal blade sideshift actuator 134 to adjust the sideshift cylinder 56 such that blade 16 is positioned in the selected blade sideshift position. Step 804 may also include indicating on user interface 104 that blade 16 has been positioned in the selected blade sideshift position.

In a step 806, motor grader 10 may perform a grading operation. Step 806 may include receiving an operator input, for example, via user interface 104, a joystick, pedal, etc., to advance along a path. The path may be pre-programmed or operator controlled (e.g., via a steering wheel). During the grading operation, step 806 may include monitoring the blade sideshift position via blade sideshift sensor 58 to ensure that blade 16 maintains the selected blade sideshift position during the grading operation. For example, if sideshift sensor 58 detects an sideshift position of blade 16 other than the position that corresponds to the selected blade sideshift position, controller 102 may signal blade sideshift actuator 134 to operate sideshift cylinder 56 to return blade 16 to the appropriate position.

In a step 808, the operator may override the selected blade sideshift position or end the grading operation. For example, controller 102 may indicate an error or warning condition, or the operator may repeat step 802 and select a different blade sideshift position from the plurality of predetermined blade sideshift positions, may activate a manual control, may deactivate motor grader 10, etc.

FIGS. 9A and 9B are front views of motor grader 10 with blade 16 positioned in various blade sideshift positions. It is noted that various components of motor grader 10 are omitted in FIGS. 9A and 9B for clarity. FIG. 9A shows blade 16 in a centered position relative to motor grader 10 and front frame 12. The centered position may be selected to provide a centered reference point when positioning motor grader 10 or transporting motor grader 10 over the worksite, since blade 16 is centered relative to the width of motor grader 10. FIG. 9B shows blade 16 in an extended position relative to motor grader 10 and front frame 12. The extended position of FIG. 9B may correspond to a general spreading operation for gravel, dirt, etc., as the heel or back edge of blade 16 and a resulting windrow of material may fall well outside of the tracks of rear tandem wheels 18. Although not shown, blade 16 may be positioned in one or more positioned between the positions shown in FIGS. 9A and 9B. Furthermore, blade 16 may be positioned in an extended position to either the right or left side of motor grader 10. Blade 16 may also be further extended from drawbar 26 via blade sideshift cylinder 56 (FIG. 2A), and such configuration may correspond to grading material that is further away from the centerline of motor grader 10. The blade sideshift positions shown in FIGS. 9A and 9B may be displayed on user interface 104 with selectable icons or images of their configurations, words descriptive of the various functions (e.g., centered, reference, extended, spreading, etc.), or other indicators. As mentioned above, blade sideshift cylinder 56, and thus blade 16, may be positioned at any number of operator-defined or preprogrammed positions, for example, via user interface 104. Furthermore, sideshift sensor 58 may detect a blade sideshift position in order to confirm that blade 16 maintains the selected blade sideshift position during the grading operation. For example, if sideshift sensor 58 detects an position of blade 16 other than the position that corresponds to the selected or operator-defined blade sideshift, controller 102 may signal blade sideshift actuator 128 to operate blade sideshift cylinder 32 to return blade 16 to the appropriate position.

Figure 10:
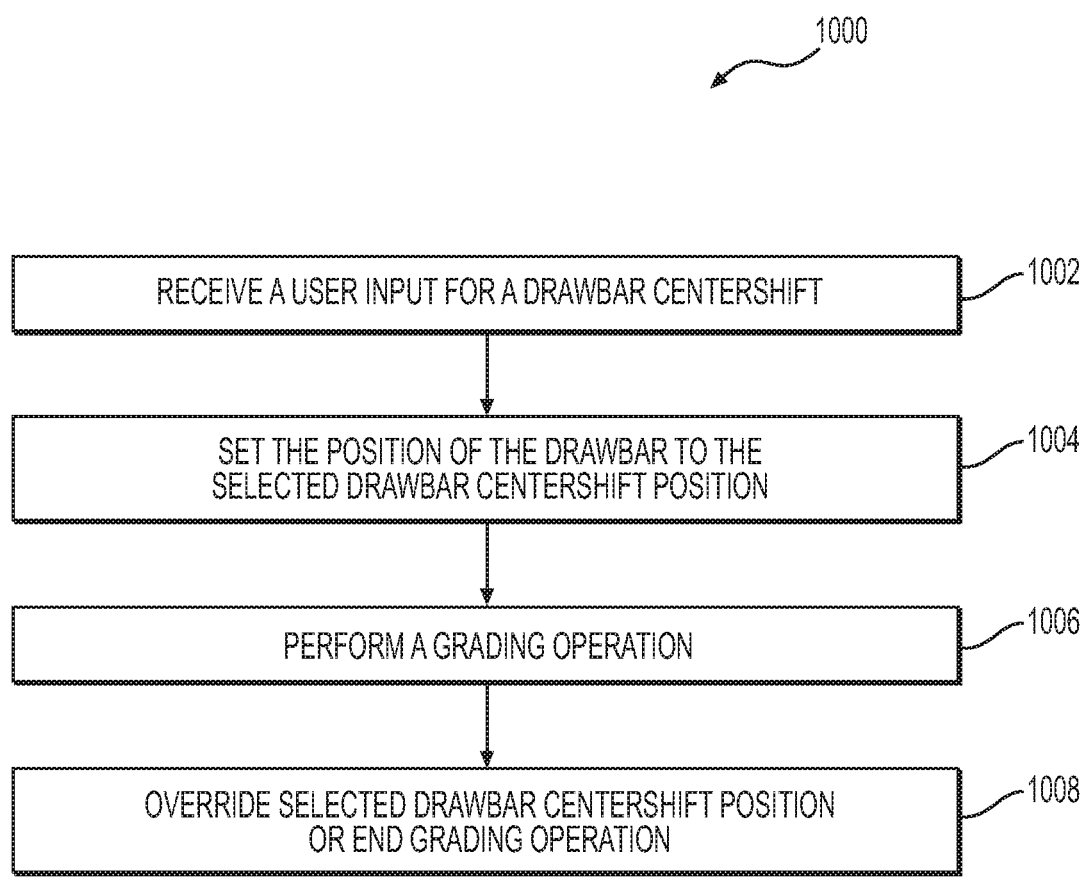
FIG. 10 provides a flow chart depicting an exemplary method for controlling a drawbar centershift of a grading machine, according to aspects of this disclosure.

FIGS. 10 and 11A-11C illustrate various aspects of this disclosure related to adjusting the centershift of drawbar 26. For example, FIG. 10 is a flow diagram portraying an exemplary drawbar centershift adjustment method 1000 that may be performed by control system 100 to position drawbar 26. Method 1000 includes a step 1002, where machine 10 may receive an operator input (e.g., through user interface 104) to position drawbar 26 in one of a plurality of predetermined drawbar centershift positions. The predetermined drawbar centershift positions may be stored in the memory of controller 102 and transmitted to user interface 104. For example, user interface 104 may include a drawbar centershift icon displayed on a home screen for a drawbar centershift selection mode. An operator may select the drawbar centershift selection mode, and user interface 104 may then display the plurality of predetermined drawbar centershift positions, for example, with individual selectable icons. Alternatively, the drawbar centershift selection mode may allow an operator to input a specific drawbar centershift position. The selected drawbar centershift position may be transmitted from user interface 104 to controller 102 (FIG. 3).

In a step 1004, motor grader 10 may set the position of drawbar 26 to the selected drawbar centershift position. For example, controller 102 may receive information from drawbar centershift sensor 42 related to the current position of drawbar 26, and thus the current centershift position of drawbar 26. If there is a difference between the current position of drawbar 26 and the selected drawbar centershift position, controller 102 may signal drawbar centershift actuator 128 to adjust the centershift cylinder 32 such that drawbar 26 is positioned in the selected drawbar centershift position. Step 1004 may also include indicating on user interface 104 that drawbar 26 has been positioned in the selected drawbar centershift position.

In a step 1006, motor grader 10 may perform a grading operation. Step 1006 may include receiving an operator input, for example, via user interface 104, a joystick, pedal, etc., to advance along a path. The path may be pre-programmed or operator controlled (e.g., via a steering wheel). During the grading operation, step 1006 may include monitoring the drawbar centershift position via drawbar centershift sensor 42 to ensure that drawbar 26 maintains the selected drawbar centershift position during the grading operation. For example, if centershift sensor 42 detects a centershift position of blade 16 other than the position that corresponds to the selected or operator-defined drawbar centershift position, controller 102 may signal drawbar centershift actuator 128 to operate centershift cylinder 32 to return drawbar 26 to the appropriate position.

In a step 1008, the operator may override the selected drawbar centershift position or end the grading operation. For example, controller 102 may indicate an error or warning condition, or the operator may repeat step 1002 and select a different drawbar centershift position from the plurality of predetermined drawbar centershift positions, may activate a manual control, may deactivate motor grader 10, etc.

FIGS. 11A-11C are front views of motor grader 10 with blade 16 in various positions that correspond to drawbar 26 being positioned in various drawbar centershift positions. It is noted that various components of motor grader 10 are omitted in FIGS. 11A-11C for clarity, and that blade 16 may include a blade tilt or blade angle. FIG. 11A shows motor grader 10 and blade 16 with drawbar 26 in a centered position relative to motor grader 10 and front frame 12. The centered position may be selected to provide a centered reference point or a baseline position, which may be used when spreading material (e.g., gravel, dirt, etc.). FIG. 11B shows motor grader 10 with drawbar 26 at a slight angle from front frame 12, for example, 10 to 15 degrees, such that blade 16 extends to a side of motor grader 10. The configuration shown in FIG. 11B may be used for grading such that the graded material is cast outside of the rear tandem wheels 18. FIG. 11C shows motor grader 10 with drawbar 26 extended from front frame 12, for example, 20 to 45 degrees, such that blade 16 extends well beyond the sides of motor grader 10. The configuration shown in FIG. 11C may be used for grading an area well outside the path of motor grader 10. As shown in the configurations of FIGS. 11B and 11C, right lift cylinder 28 and left lift cylinder 30 may pivot in a direction opposite to the direction of drawbar extension. Additionally, the configuration shown in FIG. 11C, along with positions of drawbar 26, may be used in one or more maintenance or ditching modes (FIGS. 13 and 15A-15D). It is noted that controller 102 may control centershift cylinder 32 in order to shift drawbar 26 left or right relative to front frame 12, and thus extend blade 16 to the left or right of motor grader 10.

For those motor grader operations requiring more drawbar extension than the centershift cylinder 32 can accommodate alone, such as in maintenance and ditching operation modes, the linkbar 34 can be side-shifted. As discussed above in connection with FIG. 2C, linkbar 34 can be side-shifted by repositioning the fulcrum of the linkbar 34 into different position holes 70 of linkbar 34. For example, in a first step, the drawbar 26 can be moved to a maximum reach in a direction toward the grading location, then the blade 16 may then be grounded by controlling the right and left lift cylinders 28, 30 into a float condition. Thereafter, the linkbar pin 76 is controlled to retract out of the position hole 70 (e.g. out of a center-most position hole 84) to allow side-shifting of linkbar 34. The centershift cylinder 32 is then actuated in a direction away from the grading location and a new position hole 70 is aligned with the linkbar pin 76. The linkbar pin 76 is then extended into the new position hole 70 and the centershift cylinder 32 can be extended toward the grading location for additional reach. When side-shifting the linkbar 34 to an outermost position hole 70, the lift cylinders 28, 30 can be taken out of the float condition and controlled to align the position hole 70 with the linkbar pin 76.

The drawbar centershift angles shown in FIGS. 11A-11C may be displayed on user interface 104 with selectable icons or images of their configurations, word descriptive of the various functions (e.g., centered, reference, angled, casting, grading, maintenance, ditching, etc.), or other indicators. As mentioned above, centershift cylinder 32, and thus drawbar 26, may be positioned at any number of operator-defined positions, for example, via user interface 104. Furthermore, it is noted that blade sideshift and drawbar centershift may be selected and adjusted separately or may be selected and adjusted simultaneously in order to position blade 16 and drawbar 26 for the grading operation.

Figure 12:
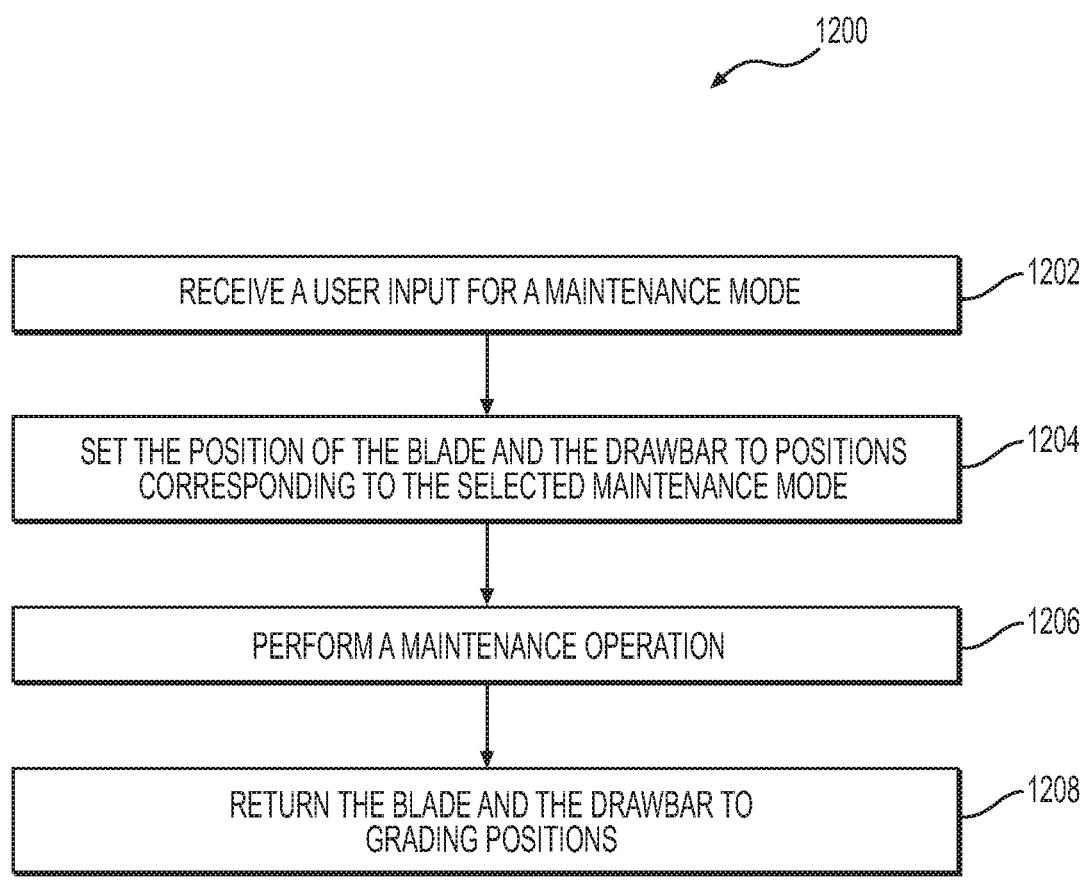
FIG. 12 provides a flow chart depicting an exemplary method for controlling a grading portion of the grading machine for at least one cutting edge maintenance mode, according to aspects of this disclosure.
Figure 13:
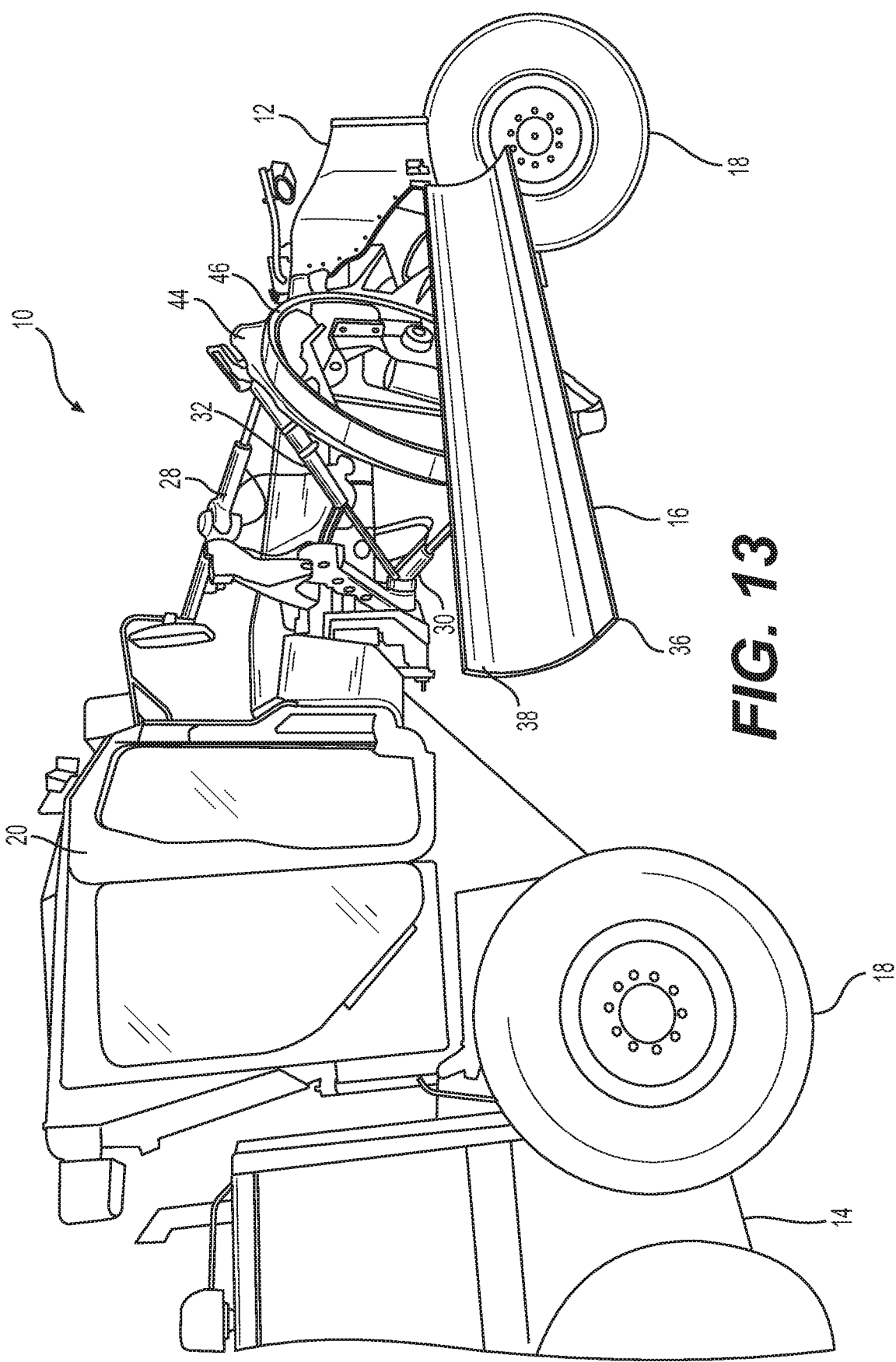
FIG. 13 is a side view of the exemplary grading machine with the grading portion in a cutting edge maintenance mode, according to aspects of this disclosure.

FIGS. 12 and 13 illustrate various aspects of this disclosure related to positioning of blade 16 and drawbar 26 for inspection, maintenance, replacement, etc. of cutting edge 36 (referred to as a "maintenance mode"). For example, FIG. 12 is a flow diagram portraying an exemplary method 1200 that may be performed by control system 100 to position drawbar 26 and blade 16 to allow for an operator to inspect, maintain, replace, or otherwise treat cutting edge 36 or other portions of blade 16. Method 1200 includes a step 1202, where motor grader 10 may receive an operator input (e.g., through user interface 104) to enter one or more maintenance modes, each of which include predetermined blade and drawbar positions. The predetermined blade and drawbar positions may be stored in the memory of controller 102 and transmitted to user interface 104. For example, user interface 104 may include a maintenance mode icon displayed on a home screen. An operator may select the maintenance mode, and user interface 104 may then display the one or more maintenance modes with the predetermined blade and drawbar positions, for example, with individual selectable icons depicting the positions and/or listing the maintenance job to be performed. The various maintenance modes may correspond to various maintenance functions. For example, a first maintenance mode may be designed for inspecting cutting edge 36, and may include first blade and drawbar positions on a right side of motor grader 10. A second maintenance mode may be designed for replacing cutting edge 36, and may include second blade and drawbar positions on the right side of motor grader 10. Similarly, third and fourth maintenance modes may be similar to first and second maintenance modes, but on the left side of motor grader. Alternatively, one maintenance mode may allow an operator to input specific positions of blade 16 and drawbar 26. The selected maintenance mode position may be transmitted from user interface 104 to controller 102 (FIG. 3).

In a step 1204, motor grader 10 may set the position of blade 16 and drawbar 26 to positions that correspond to the selected maintenance mode. For example, controller 102 may receive information from at least one of blade tilt sensor 40, drawbar centershift sensor 42, circle angle sensor 50, blade pitch sensor 54, side shift sensor 58, left blade lift sensor 114, right blade lift sensor 116, linkbar position sensor 122, etc. related to the current position and orientation of blade 16 and drawbar 26. If there is a difference between the current position and orientation of blade 16 and drawbar 26 and the selected maintenance mode position, controller 102 may signal left blade lift actuator 124, right blade lift actuator 126, drawbar centershift actuator 128, circle angle actuator 130, blade pitch actuator 132, blade sideshift actuator 134, linkbar pin actuator 82, etc. in order to actuate one or more of right lift cylinder 28, left lift cylinder 30, centershift cylinder 32, circle drive motor 48, blade pitch cylinder 52, sideshift cylinder 56, linkbar pin 76, etc. Step 1204 may also include indicating on user interface 104 that blade 16 and drawbar 26 have been positioned in the selected maintenance position.

For example, step 1204 may include controller 102 signaling the actuators to make the following adjustments in order to reposition blade 16, drawbar 26, and circle 46 from a grading position (e.g., FIG. 4A) to a maintenance mode position (e.g., FIG. 13). For example, as shown in FIG. 13, first maintenance mode may include side-shifting the linkbar 34 to an outermost position hole 70 of linkbar 34 and elevating right lift cylinder 28 and left lift cylinder 30 such that blade 16 is elevated away from the ground. Right lift cylinder 28 may also be elevated to a higher level than left lift cylinder 30 in order to blade 16 and drawbar 26 to be angled relative to the ground, which may allow an operator to access circle 46, circle drive motor 48, circle angle sensor 50, etc. Centershift cylinder 32 may be shifted fully to the right of motor grader 10 to position drawbar 26, and circle drive motor 48 may rotate circle 46 approximately 45 to 60 degrees clockwise around axis A (FIG. 1). Sideshift cylinder 56 may also be shifted fully to the right to position blade 16 to the side. Finally, in the first maintenance mode, and as shown in FIG. 13, blade pitch cylinder 52 may be retracted rearward (e.g., approximately five degrees). Although not shown, the second maintenance mode may be similar to the first maintenance mode, but blade pitch cylinder 52 may be extended forward (e.g., approximately 40 degrees), which may allow an operator to access the backside of blade 16 and its connections to drawbar 26, support arms 39, support plate 41, circle 46, etc. The third and fourth maintenance modes may be similar to first and second maintenance modes, respectively, with controller 102 signaling the actuators to position blade 16, drawbar 26, and circle 46 to the left of motor grader 10.

In a step 1206, a maintenance operation may be performed. Step 1206 may include an operator inspecting a portion of blade 16 or drawbar 26. In one aspect, if the operator notices an issue, the operator may perform maintenance for a portion of blade 16 or drawbar 26. For example, if the operator notices that cutting edge 36 is worn down, the operator may sharpen cutting edge 36, may replace blade 16 or a portion of blade 16 (e.g., by unscrewing screws 43 and uncoupling blade 16 from drawbar 26 and circle 46 by uncoupling blade 16 from support plate 41), may tighten screws 43, etc.

In one aspect, the operator may notice a potential issue, and may need to reposition blade 16, drawbar 26, circle 46, etc. in order to further inspect or to repair the issue. In this aspect, step 1206 may include repositioning blade 16 or drawbar 26 to a different maintenance mode configuration via user interface 104. For example, the operator may inspect blade 16 in the first maintenance mode and may then reposition blade 16 to the second maintenance mode in order to adjust or replace components of motor grader 10. Alternatively, the operator may inspect blade 16 and may make manual adjustments to the position of blade 16 and/or drawbar 26 in order to better inspect, repair, or replace a component of motor grader 10. In either aspect, the repositioning may be done via user interface 104.

A step 1208 may include returning blade 16 to a grading position. Step 1208 may include controller 102 signaling left blade lift actuator 124, right blade lift actuator 126, drawbar centershift actuator 128, circle angle actuator 130, blade pitch actuator 132, blade sideshift actuator 134, linkbar pin actuator 82, etc. in order to actuate one or more of right lift cylinder 28, left lift cylinder 30, centershift cylinder 32, circle drive motor 48, blade pitch cylinder 52, sideshift cylinder 58, etc. to position blade 16 and drawbar 26 beneath motor grader, and linkbar pin 76. Step 1208 may include returning blade 16, drawbar 26, and circle 46 to the respective positions before the components were moved in the maintenance mode(s). Alternatively, step 1208 may include returning blade 16, drawbar 26, and circle 46 to a predetermined centered position (e.g., FIG. 5A). Step 1208 may also include indicating on user interface 104 that blade 16, drawbar 26, and circle 46 have been positioned in the grading position.

Figure 14:
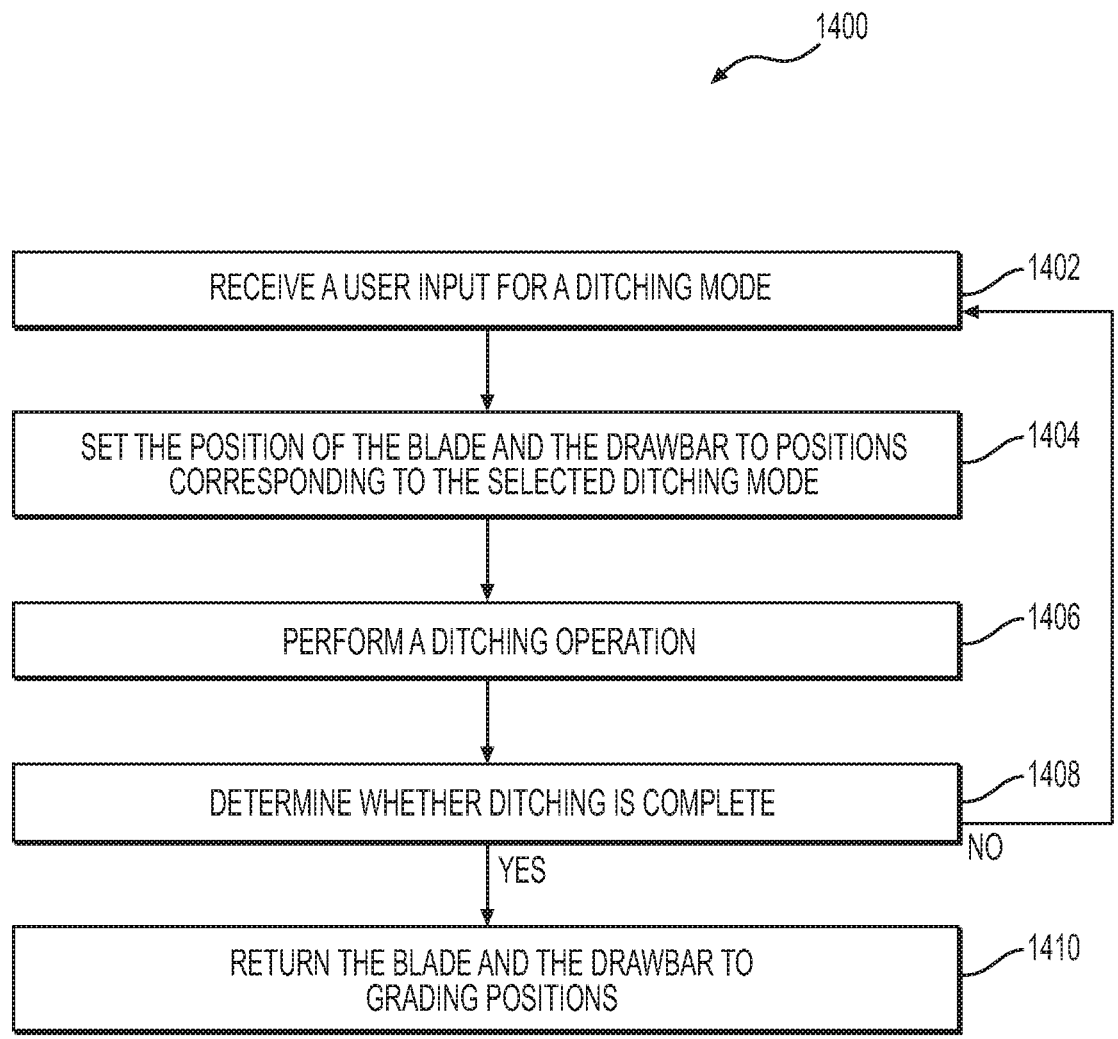
FIG. 14 provides a flow chart depicting an exemplary method for controlling a grading portion of the grading machine for one or more ditching modes, according to aspects of this disclosure.
Figure 15:
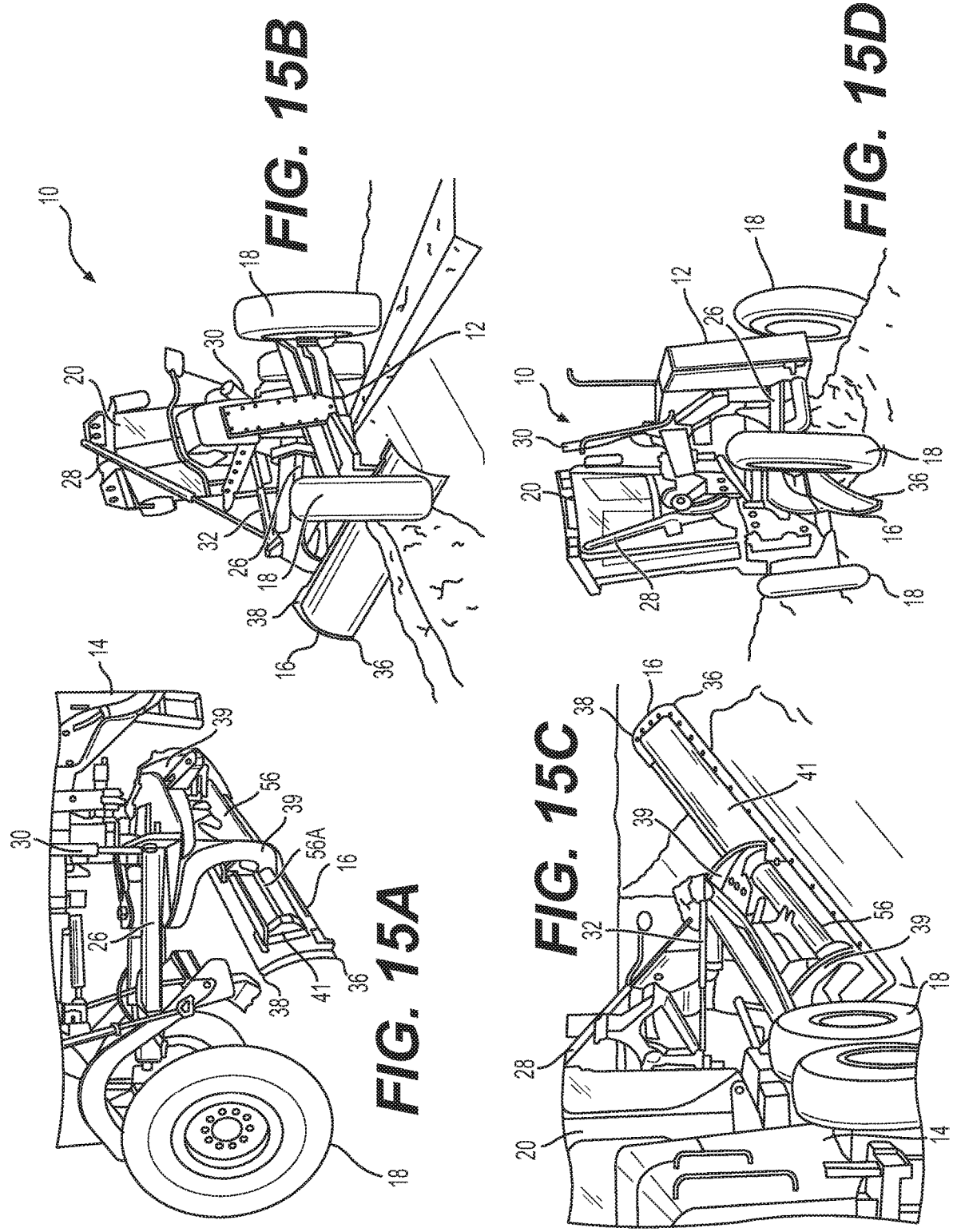
FIGS. 15A-15D are perspective views of the exemplary grading machine with the grading portion in various ditching modes, according to aspects of this disclosure.

FIGS. 14 and 15A-15D illustrate various aspects of this disclosure related to positioning blade 16 and drawbar 26 to perform one or more ditching operations. For example, FIG. 14 is a flow diagram portraying an exemplary method 1400 that may be performed by control system 100 to position drawbar 26 and blade 16 to allow for an operator to perform a variety of ditching operations. Method 1400 includes a step 1402, where motor grader 10 may receive a operator input (e.g., through user interface 104) to enter one or more ditching modes, each of which include predetermined blade and drawbar positions. The predetermined blade and drawbar positions for the ditching modes may be stored in the memory of controller 102 and transmitted to user interface 104. For example, user interface 104 may include a ditching mode icon displayed on a home screen. An operator may select the ditching mode, and user interface 104 may then display the one or more ditching modes with the predetermined blade and drawbar positions, for example, with individual selectable icons depicting the blade and drawbar positions and/or listing the type of ditching functions to be performed. The various ditching modes may correspond to various ditching functions. For example, a first ditching mode may be to form a marking pass (FIG. 15A), and a second ditching mode may be to form a back slope (FIG. 15B). Additionally, a third ditching mode may be to form a high bank slope (FIG. 15C), and a fourth ditching mode may be to perform a shoulder clean (FIG. 15D).

The ditching modes may include positioning blade 16 and drawbar 26 to the right side of motor grader 10, as shown in FIGS. 15A-15D, but may also include options to position blade and drawbar 26 on the left side of motor grader 10. Alternatively, one ditching mode may allow an operator to input specific positions or adjustments of blade 16 and drawbar 26. User interface 104 may also display additional ditching modes and/or user interfaces to modify or customize the preprogrammed ditching modes. The selected ditching mode position may be transmitted from user interface 104 to controller 102 (FIG. 3).

In a step 1404, motor grader 10 may set the position of blade 16 and drawbar 26 to positions that correspond to the selected ditching mode. For example, controller 102 may receive information from at least one of blade tilt sensor 40, drawbar centershift sensor 42, circle angle sensor 50, blade pitch sensor 54, side shift sensor 58, left blade lift sensor 114, right blade lift sensor 116, linkbar position sensor 122, etc. related to the current position and orientation of blade 16 and drawbar 26. If there is a difference between the current position and orientation of blade 16 and drawbar 26 and the selected ditching mode position, controller 102 may signal left blade lift actuator 124, right blade lift actuator 126, drawbar centershift actuator 128, circle angle actuator 130, blade pitch actuator 132, blade sideshift actuator 134, linkbar pin actuator 82, etc. in order to actuate one or more of right lift cylinder 28, left lift cylinder 30, centershift cylinder 32, circle drive motor 48, blade pitch cylinder 52, sideshift cylinder 58, linkbar pin 76, etc. Step 1404 may also include indicating on user interface 104 that blade 16 and drawbar 26 have been positioned in the selected ditching position.

For example, step 1404 may include controller 102 signaling the actuators to make the following adjustments in order to reposition blade 16 and drawbar 26 from a grading position (e.g., FIG. 4A) to the selected ditching mode position (e.g., FIGS. 15A-15D). For example, the first ditching mode shown in FIG. 15A may include side-shifting the linkbar 34 to an outer position hole 70 of linkbar 34 and positioning left lift cylinder 30 at a lower position that right lift cylinder 28 (not shown) to create a blade tilt of approximately 15 degrees. In one aspect, the left side of blade 16 may extend approximately 4-6 inches into the surface being traversed. The right side of blade 16 may be elevated above the surface being traversed such that material may be directed between rear wheels 18. First ditching mode may also include rotating circle 46 (via circle drive motor 48) to position blade 16 at a blade angle of approximately 45 degrees. Moreover, first ditching mode may include any appropriate forward blade pitch.

In a step 1406, a ditching operation may be performed. Step 1406 may include receiving an operator input, for example, via user interface 104, a joystick, pedal, etc., to advance along a path. The path may be pre-programmed or operator controlled (e.g., via a steering wheel). During the ditching operation, step 1406 may include monitoring the position and orientation of blade 16 and drawbar 26 and repositioning or reorienting blade 16 and drawbar 26 if necessary, as discussed above. Additionally, performing the ditching operation may include a wheel lean, articulation, or other positioning or steering configuration of motor grader 10 discussed herein. As discussed above, controller 102 may be in communication with various sensors to determine whether blade 16 maintains the selected or operator-defined blade position and orientation, and controller 102 and the actuators may adjust the position and orientation of blade 16 as necessary.

In a step 1408, motor grader 10 or an operator may determine whether a ditching operation is complete. For example, controller 102 may include a pre-programmed duration or distance for the ditching operation, or may include a pre-programmed ditching protocol that includes a plurality of ditching operations. Furthermore, controller 102 may indicate an error or warning condition, and may stop motor grader 102 or adjust the position of blade 16 or drawbar 26. Alternatively or additionally, an operator may use user interface 104 to select a different ditching mode or activate a manual control, such that controller 102 signals the various actuators to adjust blade 16, drawbar 26, and other components of motor grader 10 to the selected ditching mode or configuration.

If the ditching operation is complete, a step 1410 includes returning blade 16 and drawbar 26 to one or more grading positions. As discussed with respect to the maintenance modes, step 1410 may include controller 102 signaling left blade lift actuator 124, right blade lift actuator 126, drawbar centershift actuator 128, circle angle actuator 130, blade pitch actuator 132, blade sideshift actuator 134, linkbar pin actuator 82, etc. in order to actuate one or more of right lift cylinder 28, left lift cylinder 30, centershift cylinder 32, circle drive motor 48, blade pitch cylinder 52, sideshift cylinder 58, linkbar pin 76, etc. to position blade 16 and drawbar 26 beneath motor grader 10. Step 1410 may include returning blade 16, linkbar 34, and drawbar 26 to the respective positions before the components were moved in the ditching mode(s). Alternatively, step 1410 may include returning blade 16, drawbar 26, and circle 46 to a predetermined centered position (e.g., FIG. 5A). Step 1410 may also include indicating on user interface 104 that blade 16 and drawbar 26 have been positioned in the grading position.

FIGS. 15A-15D are perspective views of motor grader 10 with blade 16 and drawbar 26 in various positions that correspond to various ditching modes. It is noted that various components of motor grader 10 are omitted in FIGS.

15A-15D for clarity. As discussed above, FIG. 15A shows a side view of motor grader 10 and blade 16 with drawbar 26 in a first ditching mode. The first ditching mode may be may be used to form a marking pass. The marking pass may be performed with a wheel lean if necessary, and may be performed in a low gear of engine 22, which may be measured via engine sensor 106 (FIG. 3). In one aspect, when creating a V-shaped ditch, it may be necessary to make an initial marking pass.

FIG. 15B shows a front view of motor grader 10 in the second ditching mode with blade 16 and drawbar 26 extended to the right side of motor grader 10. The second ditching mode may be used to form a back slope. In order to position blade 16 and drawbar 26 in the second ditching mode, linkbar 34 may be side-shifted as discussed above, and drawbar centershift cylinder 32 may be extended far right of motor grader 10 in order to extend drawbar 26 far right. Right lift cylinder 28 and left lift cylinder 20 may be extended as well. Circle drive motor 48 may rotate circle 46 approximately 45 degrees, and sideshift cylinder 56 may sideshift blade 16 to the right. As shown in FIG. 15B, blade 16 may be tilted such that the left side of blade 16 engages with the material being traversed, and the right side of blade 16 may be elevated such that material is bladed into the bottom of the ditch. Additionally, wheels 18 may be leaned, as controlled by wheel lean actuators 136.

FIG. 15C shows a rear view of motor grader 10 in the third ditching mode with blade 16 and drawbar extended at a high angle to the right side of motor grader 10. The third ditching mode may be used to cut a high bank slope from a ditch. The position of blade 16 and drawbar 26 in FIG. 15C may be similar to the respective positions in the second ditching mode of FIG. 15B, except to form a higher cut. Accordingly, controller 102 may actuate the various actuators to position blade 16, linkbar 34, and drawbar 26 as discussed with respect to FIG. 15B, and right lift cylinder 28 and left lift cylinder 30 may be adjusted such that blade 16 matches (or approximates) the angle of the bank slope angle. Additionally, blade 16 may be slid away from motor grader 10 by sideshift cylinder 56, and the right side of blade 16 is elevated such that material is moved from the bank slope into the ditch. Additionally, wheels 18 may be leaned, as controlled by wheel lean actuators 136.

FIG. 15D shows a front view of motor grader 10 in the fourth ditching mode with blade 16 and drawbar 26 substantially beneath frames 12 and 14 of motor grader. The fourth ditching mode may be used to perform a shoulder clean. Centershift cylinder 32 may position drawbar 26 in a centered position. Circle 46 may be rotated by circle drive motor 48 to angle blade 16 at approximately 60 degrees or such that the right side of blade 16 is substantially aligned with the front right wheel 18. Blade pitch cylinder 52 may pitch blade 16 forward approximately 40 degrees. Motor grader 10 may traverse the ground such that a windrow of material is substantially centered between wheels 18 of front frame 12. In this aspect, the blade angle imparted by circle 46 may position a left side of blade 16 outside of the tandem wheels 18 of rear frame 14. Furthermore, wheels 18 may be leaned, as controlled by wheel lean actuators 136, and front frame 12 and rear frame 14 may be articulated, as controlled by articulation actuators 138.

FIGS. 15A-15D illustrate several grading modes. However, this disclosure is not limited to the grading modes shown in FIGS. 15A-15D. Motor grader 10 may include a variety of additional grading modes. For example, motor grader 10 may include a light or finish blading mode for lightly passing blade 16 over a surface, a curb blading mode for positioning blade 16 in order to cut or form a curb, a heavy blading mode for passing blade 16 over the surface to form a deep cut into the surface, etc.

Figure 16:
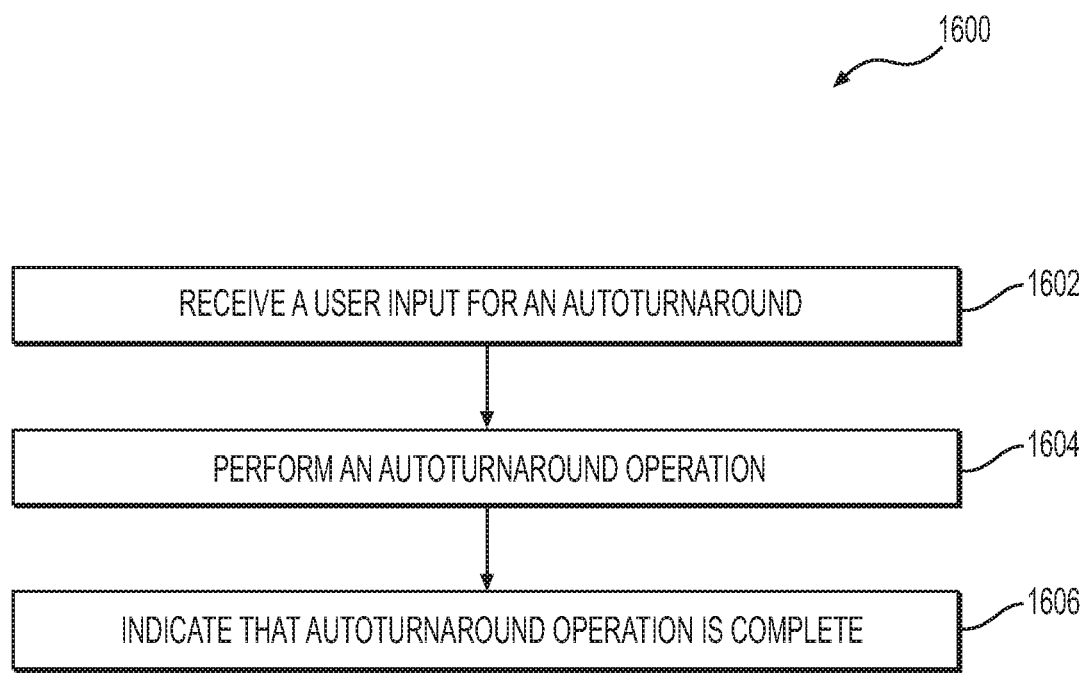
FIG. 16 provides a flow chart depicting an exemplary method for controlling a grading portion of the grading machine for one or more machine turnaround modes, according to aspects of this disclosure.

FIGS. 16, 17A, and 17B illustrate various aspects of this disclosure related to steering motor grader 10 and positioning blade 16 and drawbar 26 to perform an automatic turnaround operation. For example, FIG. 16 is a flow diagram portraying an exemplary method 1600 that may be performed by control system 100 to steer motor grader 10 and position drawbar 26 and blade 16 to perform an automatic turnaround operation. Method 1600 includes a step 1602, where motor grader 10 may receive a operator input (e.g., through user interface 104) to perform an automatic turnaround operation. The instructions and/or the configurations for an automatic turnaround operation may be stored in the memory of controller, and may be transmitted to user interface 104. For example, user interface 104 may include an automatic turnaround mode icon displayed on a home screen. An operator may select the automatic turnaround mode, and may input whether to turnaround to the left or to the right. Controller 102 may be coupled to one or more additional sensors to detect whether there is a safe area around motor grader 10 to perform the automatic turnaround. Alternatively or additionally, controller 102 may display a prompt on user interface asking the operator to check and confirm that the area around motor grader 10 is safe for the automatic turnaround.

Next, a step 1604 includes controller 102 performing the automatic turnaround. Step 1606 may include controller 102 receiving information from at least one of blade tilt sensor 40, drawbar centershift sensor 42, circle angle sensor 50, blade pitch sensor 54, side shift sensor 58, left blade lift sensor 114, right blade lift sensor 116, etc. related to the current position and orientation of blade 16 and drawbar 26. Controller 102 may store the current position and orientation of blade 16 and drawbar 26 in the memory, as the resulting configuration of blade 16 and drawbar 26 after the automatic turnaround may be a mirror image of the configuration before the automatic turnaround relative to a centerline of motor grader 10. In one aspect, for example, as shown in FIG. 17A, blade 16 and drawbar 26 may be centered relative to front frame 12 and rear frame 14. In this aspect, performing the automatic turnaround may include controller 102 steering wheels 18, actuating articulation actuators 138 to articulate front frame 12 relative to rear frame 12, and/or actuating wheel lean actuators 136 to control a wheel lean (lean left in a left turn and lean right in a right turn) in order to position motor grader 12 in a direction opposite to the original direction. The automatic turnaround may include steering motor grader 10 in a partial circle (FIG. 17B).

In another aspect, as shown in FIG. 17B, blade 16 (and/or drawbar, although not shown) may be positioned at an angle to motor grader 10 based on an orientation of circle 46. In this aspect, performing the automatic turnaround may include controller 102 steering wheels 18, actuating articulation actuators 138 to articulate front frame 12 relative to rear frame 12, and/or actuating wheel lean actuators 136 to control a wheel lean in order to position motor grader 12 in a direction opposite to the original direction, as discussed above. In addition, controller 102 may signal one or more of left blade lift actuator 124, right blade lift actuator 126, drawbar centershift actuator 128, circle angle actuator 130, blade pitch actuator 132, blade sideshift actuator 134, etc. in order to actuate one or more of right lift cylinder 28, left lift cylinder 30, centershift cylinder 32, circle drive motor 48, blade pitch cylinder 52, sideshift cylinder 58, etc. such that blade 16 is in a mirrored position relative to a centerline of motor grader 10 compared to the original blade position. In this aspect, after an operator performs a first grading pass (as discussed above) with motor grader 10, motor grader 10 may have deposited a windrow or pile of material. The operator may activate the automatic turnaround operation. The automatic turnaround operation may include steering motor grader 10 in a partial circle and repositioning blade 16, drawbar 26, circle 46, etc. to a mirrored position. The automatic turnaround operation may position motor grader 10 and blade 16 such that at least a portion of blade 16 after the automatic turnaround operation overlaps with a position of at last a portion of blade 16 before the automatic turnaround operation. Then, with the mirrored blade configuration, motor grader 10 may perform a second grading pass in order to continue grading and move the deposited windrow or pile of material.

Lastly, a step 1606 may include indicating on user interface 104 that the automatic turnaround has been completed, and that blade 16 and drawbar 26 have been positioned in the mirrored position. The operator may then initiate a spreading operation, grading operation, cutting operation, ditching operation, or other blading operation, as discussed above.

Figure 18:
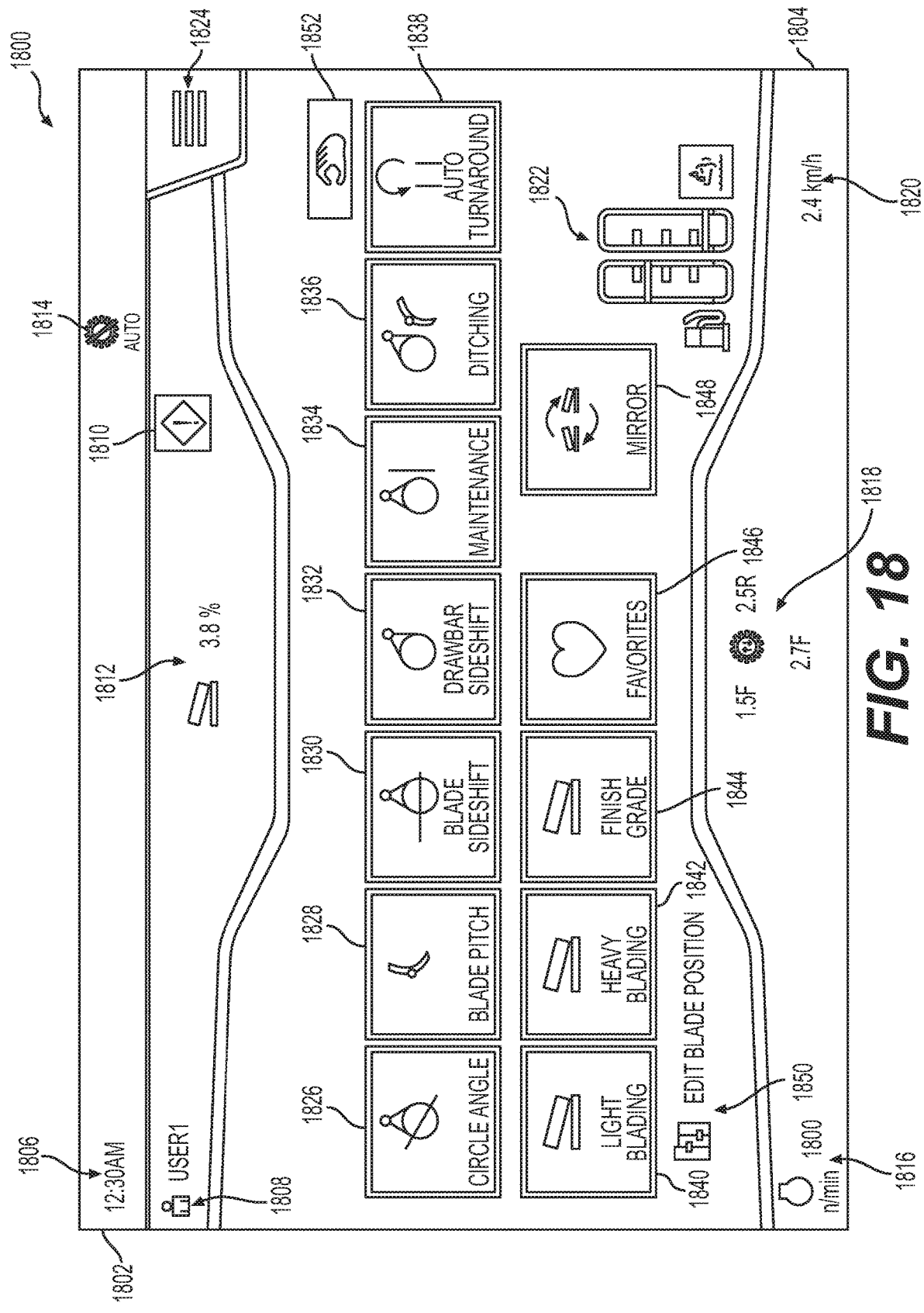
FIG. 18 is an illustration of an exemplary display that may be displayed on a user interface to control or position portions of the grading machine, according to aspects of this disclosure.

FIG. 18 illustrates an exemplary control panel display 1800 that may be displayed on user interface 104 or on another display on or remote to motor grader 10. Control panel display 1800 may be a touch screen (e.g., an iPad®, tablet, etc.), or may instead include a display or a plurality of displays and one or more pushbuttons, switches, joysticks, keyboards, etc.

Control panel display 1800 may include an automated operation control screen that displays various input options for automated control or positioning of blade 16, drawbar 26, linkbar 34, and other components of motor grader 10. Control panel display 1800 may also include various measured values or other information that may aid or other be helpful to the operator. In one aspect, control panel display 1800 may include one or more information bars, for example, a first information bar 1802 on a top portion of control panel display 1800 and a second information bar 1804 on a bottom portion of control panel display 1800. First information bar 1802 may include the time 1806 and/or date (not shown), a user identifier 1808 which may correspond to the logged in or otherwise identified operator, and one or more alert indications 1810. The one or more alert indications 1810 may be in communication with the various sensors discussed above and may indicate one or more alert situations to the operator, for example, by illumination, flashing, color change, etc. First information bar 1802 may also include a blade pitch indicator 1812, for example, as measured by blade pitch sensor 54. Blade pitch indicator 1812 may include a visual representation of the blade pitch and/or a numerical representation of the pitch of blade 16 as an angle or percentage of a total possible blade pitch in one or more directions (e.g., forward or backward from vertical). Additionally, first information bar 1802 may include a control indicator 1814, for example, to indicate whether motor grader 10 is in an automatic control mode or a manual control mode.

Second information bar 1804 may include additional sensed or measured information regarding the performance or operation of motor grader 10. For example, second information bar 1804 may include an engine output indicator 1816. In one aspect, engine output indicator may indicate a measured value output by the engine powering motor grader 10, for example, in Newtons per minute (as shown), rotations per minute, or another appropriate measurement unit. Furthermore, second information bar 1804 may indicate additional performance or operation information for motor grader 10, such as, for example, gear ratios 1818. Second information bar 1804 may also indicate a speed 1820 of motor grader 10, for example, in kilometers per hour (as shown), miles per hour, etc.

Control panel display 1800 may include additional information regarding the performance and/or operation of motor grader 10, either on first information bar 1802, second information bar 1804, or another position on control panel display 1800. For example, control panel display 1800 may also include a fuel and oil display 1822 to indicate the respective levels of fuel and oil. Fuel and oil display 1822 may include indicators on respective gauges to indicate levels of fuel and oil. Although not shown, fuel and oil display 1822 may include numerical indicators to indicate the respective fuel and oil levels, for example, as a percentage of full, as a volumetric value, etc. Fuel and oil display 1822 may also include indicators that may illuminate, flash, change color, or otherwise indicate a low level of either fuel or oil. Control panel display 1800 may also include a drop-down selector 1824. Drop-down selector 1824 may be selected by the operator in order for a drop-down menu (not shown) to appear. The drop-down menu may allow the operator to select a different operating mode, return to a home or default screen, adjust various settings for user interface 104, or other display or control features.

Figure 19:
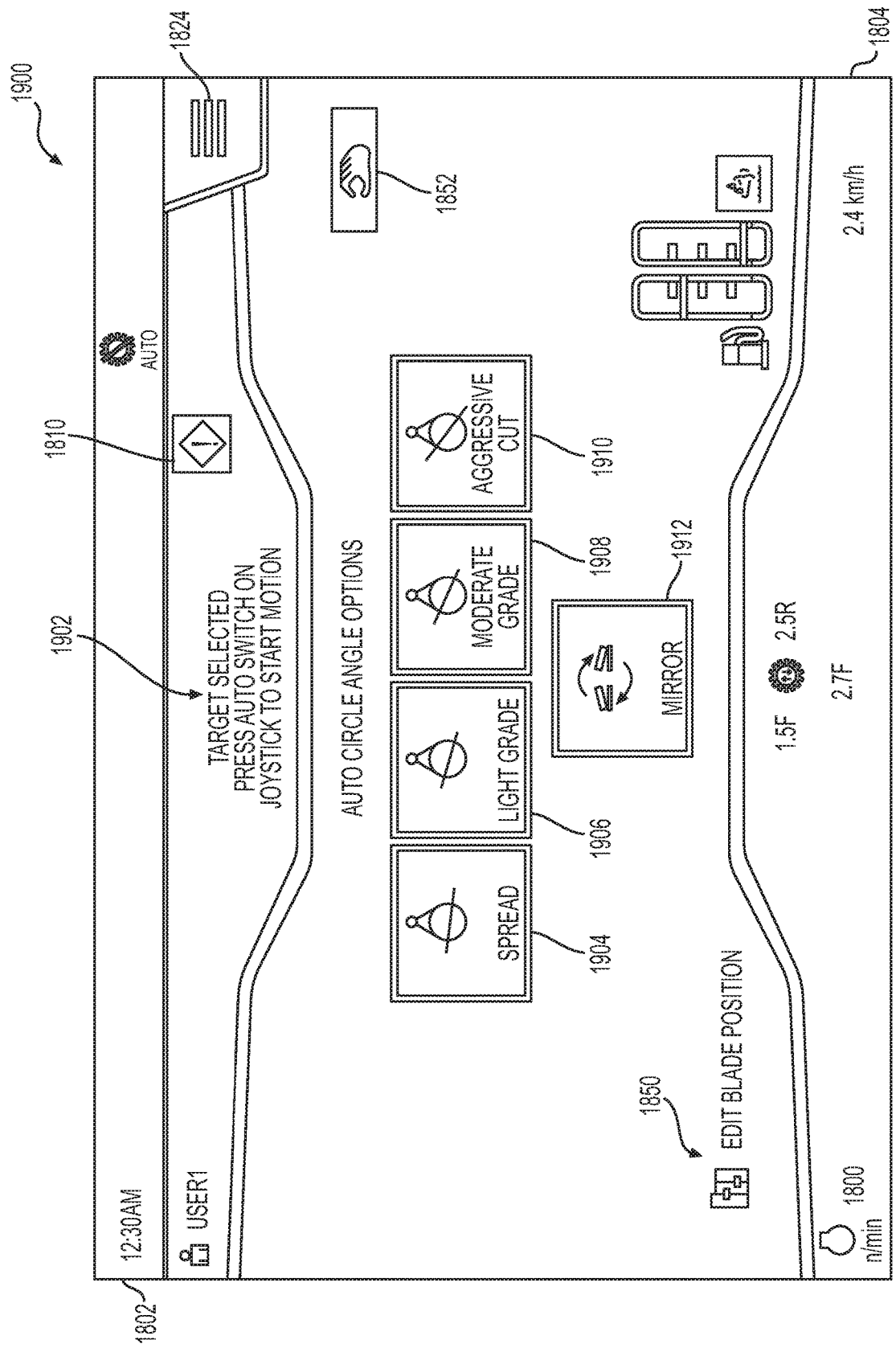
FIG. 19 is an illustration of another exemplary display that may be displayed on a user interface to control or position portions of the grading machine, according to aspects of this disclosure.

Control panel display 1800 may include a plurality of automated control or positioning icons. Each of the plurality of automated control or positioning icons may correspond to respective features of blade 16, drawbar 26, circle 46, and other components of motor grader 10. Selecting one of the automated control or positioning icons will then cause user interface 104 to display an operation-specific control panel display (FIG. 19). Each of the operation-specific control panel displays may allow the operator to select one or more positions or configurations for blade 16, drawbar 26, circle 46, or other components of motor grader 10, as discussed above.

As shown in FIG. 18, control panel display 1800 may include a circle angle icon 1826 that is selectable to control an angle of circle 46 and thus an angle of blade 16 (FIGS. 4 and 5A-5D), a blade pitch icon 1828 that is selectable to control a pitch of blade 16 (FIGS. 6 and 7A-7C), a blade sideshift icon 1830 that is selectable to control a sideshift of blade 16 (FIGS. 8, 9A, and 9B, and a drawbar sideshift icon 1832 that is selectable to control a sideshift of drawbar 26 (FIGS. 10 and 11A-11C). Furthermore, control panel display 1800 may include a maintenance icon 1834 that is selectable to control a position of blade 16, wheels 18, drawbar 26, circle 46, and/or other components of motor grader 10 to position the components in one or more maintenance positions (FIGS. 12 and 13). Control panel display 1800 may include a ditching icon 1836 that is selectable to control a position of blade 16, wheels 18, drawbar 26, circle 46, and/or other components of motor grader 10 to position the components in one or more ditching positions (FIGS. 14 and 15A-15D). Control panel display 1800 may also include an auto-turnaround icon, which is selectable to control a position of blade 16, wheels 18, drawbar 26, circle 46, and/or other components of motor grader 10 to position the components and drive and steer wheels 18 in order to perform an automatic turnaround operation (FIGS. 16 and 17A-17B).

Control panel display 1800 may include additional icons. For example, control panel display 1800 may include a light grading icon 1840, a heaving grading icon 1842, and a finish grading icon 1844. Each of light grading icon 1840, heaving grading icon 1842, and finish grading icon 1844 may allow the operator to select a light grading operation, a heaving grading operation, or a heavy grading operation, and each type of operation may include predetermined positions for one or more of blade 16, wheels 18, drawbar 26, circle 46, and/or other components of motor grader 10. Once the operator selects the icon that corresponds to the desired operation, controller 102 may position the components to the corresponding positions, and/or user interface 104 may display a respective display to allow the operator to view and/or adjust the positions of the components.

Control panel display 1800 may further include a favorites icon 1846. Selecting favorites icon 1846 may allow the operator to selectively position one or more of blade 16, wheels 18, drawbar 26, circle 46, and/or other components of motor grader 10 to one or more operator-selected arrangements. The operator may then save the one or more operator-selected arrangements as a "favorite" arrangement. Selecting favorites icon 1846 may also display the pre-programmed favorite arrangements. The operator may then select one of the pre-programmed favorite arrangements, and controller 102 may then position blade 16, wheels 18, drawbar 26, circle 46, and/or other components of motor grader 10 to the selected favorite arrangement.

Control panel display 1800 may also include a mirror icon 1848. Selecting mirror icon 1848 may position blade 16, wheels 18, drawbar 26, circle 46, and/or other components of motor grader 10 to a mirrored configuration. For example, if blade 16 is tilted 30 degrees to the left in a first configuration, blade 16 will be tilted 30 degrees to the right in the mirrored configuration, similar to the auto-turnaround discussed above with respect to FIGS. 16, 17A, and 17B but without reversing a travel direction of motor grader 10. Moreover, control panel display 1800 may include an edit blade position icon 1850. Selecting edit blade position icon 1850 may cause user interface 104 to display an additional display screen that allows the operator to edit or adjust various aspects of the position of blade 16, for example, tilt, angle, pitch, sideshift, lift, etc. Control panel display 1800 may also include a manual control icon 1852. Selecting manual control icon 1852 may cause user interface 104 to display an additional display screen that allows the operator to fully manually control the positions and configurations of blade 16, wheels 18, drawbar 26, circle 46, and/or other components of motor grader 10. Control panel display 1800 may further include additional icons or buttons to allow the operator to control or adjust additional aspects of blade 16, wheels 18, drawbar 26, circle 46, and/or other components of motor grader 10. For example, after selecting manual control icon 1852, an operator may select an automated control icon (not shown) to return to control panel display 1800 for the above-discussed automated positioning and control options.

FIG. 19 illustrates a second exemplary control panel display, for example, an operation-specific control panel display 1900. In this aspect, FIG. 19 illustrates a display that may be displayed on user interface 104 after the operator selects circle angle icon 1828. Additionally, display 1900 may include various instructions 1902 for the operator. In one aspect, instructions 1902 may indicate to the operator to perform one or more functions when certain conditions are present. In one aspect, with a grading path or "target selected" and motor grader 10 in an automated operation condition (i.e., with the "auto switch on") instructions 1902 may instruct the operator to activate an interface or joystick to start motion of motor grader 10.

Furthermore, operation-specific control panel display 1900 may correspond to circle angle icon 1828 and may display a plurality of automated circle angle options. The automated circle angle options may include corresponding icons, such as, for example, a spread icon 1904, a light grade icon 1906, a moderate grade icon 1908, an aggressive cut icon 1910, etc. Each icon may include a visual depiction of the positions and configurations of blade 16 and circle 46 that correspond to each circle angle option, for example, as shown in FIGS. 5A-5D. Selecting one of spread icon 1904, light grade icon 1906, moderate grade icon 1908, or aggressive cut icon 1910 may signal controller 102 to position circle 46, and thus blade 16, in the selected configuration. Additionally, controller 102 may signal motor grader 10 to begin performing the grading operation with the selected configuration. Alternatively, the operator may actuate one or more controls (e.g., a joystick, foot pedal, steering wheel, etc.) to steer and drive motor grader 10.

Display 1900 may also include a mirror icon 1912, edit blade position icon 1850, manual control icon, and one or more alert indications 1810. For example, once a grading configuration icon has been selected, the operator may select mirror icon 1912, and controller 102 may position blade 16, wheels 18, drawbar 26, circle 46, and/or other components of motor grader 10 to a mirrored configuration. For example, if circle 46 is at a position 30 degrees to the left in a first configuration, circle 46 will be positioned 30 degrees to the right in the mirrored configuration, similar to the auto-turnaround discussed above with respect to FIGS. 16, 17A, and 17B but without reversing a travel direction of motor grader 10. Moreover, selecting edit blade position icon 1850 may cause user interface 104 to display an additional display screen that allows the operator to edit or adjust various aspects of the position of blade 16, for example, tilt, angle, pitch, sideshift, lift, etc. Selecting manual control icon 1852 may allow the operator to manually control blade 16, wheels 18, drawbar 26, circle 46, and/or other components of motor grader 10. Moreover, if an error or alarm situation, the one or more alert indications may indicate one or more alert situations to the operator, for example, by illumination, flashing, color change, etc.

INDUSTRIAL APPLICABILITY

The disclosed aspects of motor grader 10 may be used in any grading or sculpting machine to assist in positioning of one of blade 16, drawbar 26, circle 46, or other elements, and may help an inexperienced operator perform one or more complex or complicated maneuvers. Because controller 102 is coupled to the plurality of sensors and actuators, motor grader 10 may more accurately position blade 16, drawbar 26, or circle 46 to one or more predetermined positions. Additionally, if one of blade 16, drawbar 26, or circle 46 rotates, lifts, or is otherwise moved, which is common due to the heavy forces involved in grading, controller 102 may indicate the movement to the operator via user interface 104, and/or may automatically reposition blade 16, drawbar 26, or circle 46 to the selected predetermined position. Alternatively or additionally, once blade 16, drawbar 26, circle 46, linkbar 34, and other elements are positioned in one or more configurations, the operator may then take manual control to adjust the position or configuration of one or more elements based on ground conditions, material being spread or graded, environmental factors, obstacles, etc. As such, motor grader 10 may yield a clean, accurately graded or sculpted surface after motor grader 10 passes over the ground surface.

Furthermore, controller 102 includes a memory that stores the plurality of predetermined positions and orientations for blade 16, drawbar 26, circle 46, along with the corresponding positions for one or more of right lift cylinder 28, left lift cylinder 30, centershift cylinder 32, circle drive motor 48, blade pitch cylinder 52, sideshift cylinder 58, etc. Accordingly, the operator may accurately position blade 16, drawbar 26, circle 46, and the other components to one of the plurality of predetermined positions and orientations without having to estimate the respective positions and orientations from the operator's position in cab 20, control individual actuators, or require on assistance from another operator positioned around motor grader 10. Accurately positioning and orienting blade 16, drawbar 26, circle 46, and the other components may help motor grader 10 to more accurately and/or efficiently perform a grading operation, a maintenance operation, a ditching operation, an automatic turnaround operation, etc. As a result, the aspects disclosed herein may help an operator accurately and quickly maneuver motor grader 10 and perform various operations. Moreover, positioning blade 16, drawbar 26, and circle 46 in one of the plurality of predetermined positions may help ensure that blade 16 is positioned at an appropriate blade tilt, blade angle, blade pitch, sideshift position, etc., which may reduce wear on cutting edge 36, promote material rolling in a spreading operation, efficiently penetrate or cut material in grading or cutting operations, accurately cast the spread, graded, or cut material, etc. Reducing wear on cutting edge 36 and accurately positioning blade 16, drawbar 26, and circle 46 may increase the lifetime of blade 16 and other components of motor grader 10, while also allowing an operator to efficiently perform the various operations and maneuvers discussed herein.

It will be apparent to those skilled in the art that various modifications and variations can be made to the disclosed machine without departing from the scope of the disclosure. Other embodiments of the machine will be apparent to those skilled in the art from consideration of the specification and practice of the control system for a grading machine disclosed herein. It is intended that the specification and examples be considered as exemplary only, with a true scope of the disclosure being indicated by the following claims and their equivalents.

What is claimed is:

1. A grading machine, comprising:
    a machine body;
    a grading blade;
    at least one grading blade sensor configured to sense a position and orientation of the grading blade;
    a drawbar connecting the grading blade to the machine body;
    at least one drawbar sensor configured to sense a position and orientation of the drawbar;
    a user interface;
    a blade angle sensor coupled to the grading blade;
    a rotatable circle coupling the grading blade to the drawbar;
    a circle drive motor;
    a drawbar centershift cylinder; and
    a control system configured to receive an input from the user interface and perform an automatic turnaround operation,
    wherein the automatic turnaround operation includes maneuvering the grading machine from a first position with the machine body in a first direction to a second position with the machine body in a second direction opposite to the first direction, wherein the first position includes the grading blade and the drawbar in a first blade position, and the second position includes the grading blade and the drawbar in a second blade position that mirrors the first blade position relative to a centerline of the machine body, wherein the control system includes a controller, wherein the controller is configured to receive the position and orientation of the drawbar and the grading blade from the drawbar sensor in response to the input from the user interface, wherein the controller is configured to signal the circle drive motor and the drawbar centershift cylinder to position the grading blade and the drawbar such that the grading blade is positioned in the second blade position in the automatic turnaround operation,
    wherein the controller is coupled to one or more additional sensors to detect whether there is a safe area for the grading machine to perform the automatic turnaround operation,
    wherein maneuvering the grading blade and the drawbar from the first blade position to the second blade position includes maneuvering one or more of a right lift cylinder, a left lift cylinder, the drawbar centershift cylinder, the linkbar, the circle drive motor, a blade pitch cylinder, and a sideshift cylinder, and
    wherein the control system is configured to maneuver the grading machine from the first position to the second position and to maneuver the grading blade and the drawbar from the first blade position to the second blade position simultaneously.

2. The grading machine of claim 1, wherein a steering operation includes driving the grading machine in a partial circle to position the machine body in the second position simultaneously with the maneuvering of the grading blade and the drawbar from the first blade position to the second blade position.

3. The grading machine of claim 1, further including at least one wheel lean sensor configured to measure a wheel lean of at least one wheel on the grading machine.

4. The grading machine of claim 3, wherein the automatic turnaround operation includes actuating at least one wheel lean actuator to control the wheel lean of at least one wheel on the grading machine.

5. The grading machine of claim 1, wherein the user interface is a touch screen interface mounted in a cab of the grading machine, wherein the touch screen interface includes a control panel display, and wherein the control panel display includes an auto-turnaround icon that is selectable to automatically control positions of the grading blade, wheels, and the drawbar to steer the grading machine and transition the grading blade from the first position to the second position.

6. The grading machine of claim 1, wherein the controller is coupled to the user interface and is configured to display a prompt on the user interface asking an operator to check and confirm that an area around the grading machine is safe for the automatic turnaround operation.

7. A method of operating a grading machine, comprising:
    receiving a user input to perform an automatic turnaround operation on a user interface, wherein receiving the user input includes receiving a user input via a touch screen on the user interface;
    sensing a first drawbar orientation with at least one drawbar sensor coupled to a drawbar;
    sensing a first grading blade orientation with at least one blade sensor coupled to the grading blade; detecting with one or more additional sensors whether there is a safe area for the grading machine to perform the automatic turnaround operation, displaying a prompt on the user interface asking an operator to check and confirm that an area around the grading machine is safe for the automatic turnaround operation;

steering the grading machine in a partial circle;

simultaneously with the steering of the grading machine in the partial circle, actuating one or more actuators to position the drawbar in a second drawbar orientation and the grading blade in a second grading blade orientation, wherein the second drawbar orientation and the second grading blade orientation mirror the first drawbar orientation and the first grading blade orientation relative to a centerline of the grading machine; and indicating on the user interface that the grading machine is ready to grade after the automatic turnaround is complete, wherein the automatic turnaround operation includes controlling a wheel lean of one or more wheels and controlling an articulation of the grading machine, and wherein at least a portion of the grading blade in the second grading blade orientation after the automatic turnaround operation overlaps with at least a portion of the grading blade in the first grading blade orientation before the automatic turnaround operation.

8. The method of claim 7, wherein positioning the drawbar and the grading blade to the second drawbar orientation and the second grading blade orientation includes extending or retracting a drawbar centershift cylinder and rotating a circle with a circle drive motor.

9. The method of claim 7, wherein the touch screen includes a control panel display, and wherein the control panel display includes an auto-turnaround icon that is selectable to control automatically positions of the grading blade, wheels, and the drawbar to steer the grading machine and transition automatically the grading blade from the first position to the second position.

10. A method of operating a grading machine, comprising:

receiving a user input to perform an automatic turnaround operation on a user interface, wherein receiving the user input includes receiving a user input via a touch screen on the user interface, and wherein the touch screen includes an auto-turnaround icon;

sensing a first drawbar orientation with at least one drawbar sensor coupled to a drawbar;

sensing a first grading blade orientation with at least one blade sensor coupled to a grading blade; detecting with one or more additional sensors whether there is a safe area for the grading machine to perform the automatic turnaround operation, displaying a prompt on the user interface asking an operator to check and confirm that an area around the grading machine is safe for the automatic turnaround operation;

steering the grading machine in a partial circle;

simultaneously with the steering of the grading machine in the partial circle, actuating one or more actuators to position the drawbar in a second drawbar orientation and the grading blade in a second grading blade orientation wherein positioning the drawbar and the grading blade to the second drawbar orientation and the second grading blade orientation includes extending or retracting a drawbar centershift cylinder and rotating a circle with a circle drive motor, and wherein the automatic turnaround operation includes controlling a wheel lean of each of one or more wheels and controlling an articulation of the grading machine; and indicating on the user interface that the grading machine is ready to grade after the automatic turnaround is complete, wherein the second drawbar orientation and the second grading blade orientation mirror the first drawbar orientation and the first grading blade orientation, respectively, relative to a centerline of the grading machine, and wherein at least a portion of the grading blade in the second grading blade orientation after the automatic turnaround operation overlaps with at least a portion of the grading blade in the first grading blade orientation before the automatic turnaround operation.

\* \* \* \* \*